United States Patent
Kim et al.

(10) Patent No.: US 11,057,832 B2
(45) Date of Patent: Jul. 6, 2021

(54) METHOD AND APPARATUS FOR TRANSMITTING AND RECEIVING A WAKE-UP SIGNAL IN A WIRELESS COMMUNICATION SYSTEM

(71) Applicant: LG ELECTRONICS INC., Seoul (KR)

(72) Inventors: Sanggook Kim, Seoul (KR); Ki-Dong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 111 days.

(21) Appl. No.: 16/606,205

(22) PCT Filed: Dec. 27, 2017

(86) PCT No.: PCT/KR2017/015558
§ 371 (c)(1),
(2) Date: Oct. 17, 2019

(87) PCT Pub. No.: WO2018/194239
PCT Pub. Date: Oct. 25, 2018

(65) Prior Publication Data
US 2020/0137685 A1    Apr. 30, 2020

Related U.S. Application Data

(60) Provisional application No. 62/536,428, filed on Jul. 24, 2017, provisional application No. 62/487,984, filed on Apr. 20, 2017.

(51) Int. Cl.
*H04W 52/02* (2009.01)
(52) U.S. Cl.
CPC ... *H04W 52/0229* (2013.01); *H04W 52/0216* (2013.01)

(58) Field of Classification Search
CPC ......... H04W 52/0229; H04W 52/0216; H04W 52/0241; H04W 52/0245; H04W 84/12; Y02D 30/70
See application file for complete search history.

(56) References Cited

U.S. PATENT DOCUMENTS

2018/0234921 A1* 8/2018 Huang .............. H04W 52/0235
2020/0344005 A1* 10/2020 Komoriya ......... H04W 28/0231

FOREIGN PATENT DOCUMENTS

| WO | 2016144384 | 9/2016 |
|----|------------|--------|
| WO | 2017034605 | 3/2017 |
| WO | 2017052596 | 3/2017 |

OTHER PUBLICATIONS

PCT International Application No. PCT/KR2017/015558, International Search Report dated Jun. 1, 2018, 3 pages.
(Continued)

*Primary Examiner* — Marcos L Torres
(74) *Attorney, Agent, or Firm* — Lee, Hong, Degerman, Kang & Waimey PC

(57) ABSTRACT

Disclosed herein is a method for transmitting a wake-up signal in a wireless communication system supporting a wake-up radio (WUR) operation. The method performed by a network entity comprises transmitting a first wake-up signal for waking up a specific terminal to a specific access point (AP); transmitting a second wake-up signal to all APs within the coverage of the network entity if a response for the first wake-up signal is not received before a first timer expires; and transmitting, to a base station, a response message including control information indicating whether the specific terminal exists.

9 Claims, 15 Drawing Sheets

(56) References Cited

OTHER PUBLICATIONS

Wilhelmsson, L. et al., "Discussion of Duty-Cycled Wake-Up Receivers," doc.: IEEE 802.11-16/0968r0, Jul. 2016, 14 pages.
Liu, J. et al., "On Waking-Up Multiple WUR Stations," doc.: IEEE 802.11-17/0028r0, Jan. 2017, 8 pages.
Park, M. et al., "LP-WUR (Low-Power Wake-Up Receiver) Follow-Up," doc.: IEEE 802.11-16/0341r0, Mar. 2016, 11 pages.
European Patent Office Application Serial No. 17906406.8, Search Report dated Mar. 4, 2021, 10 pages.
Park et al., "LP-WUR (Low-Power Wake-Up Receiver): Enabling Low-Power and Low-Latency Capability for 802.11", IEEE 802.11-16/0027r0, Jan. 18, 2016, 21 pages.
Burbidge, "Liaison from 3GPP on LWA and LWIP", IEEE 802.11-16/351r1, Mar. 14, 2016, 25 pages.

\* cited by examiner

FIG. 7
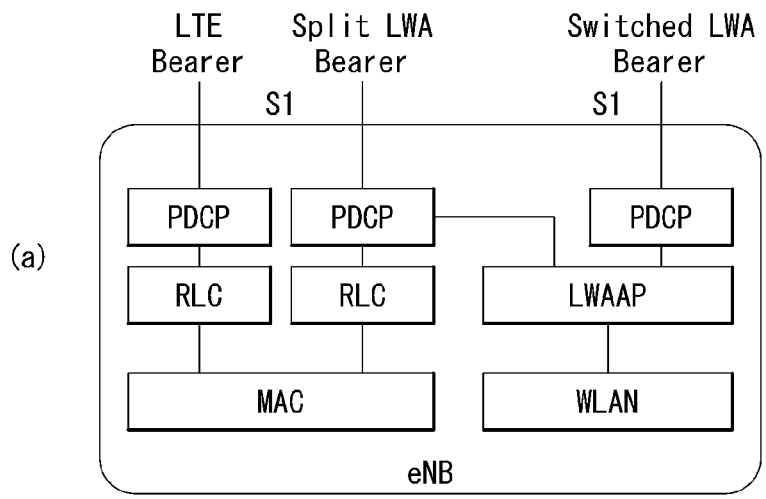
(a)
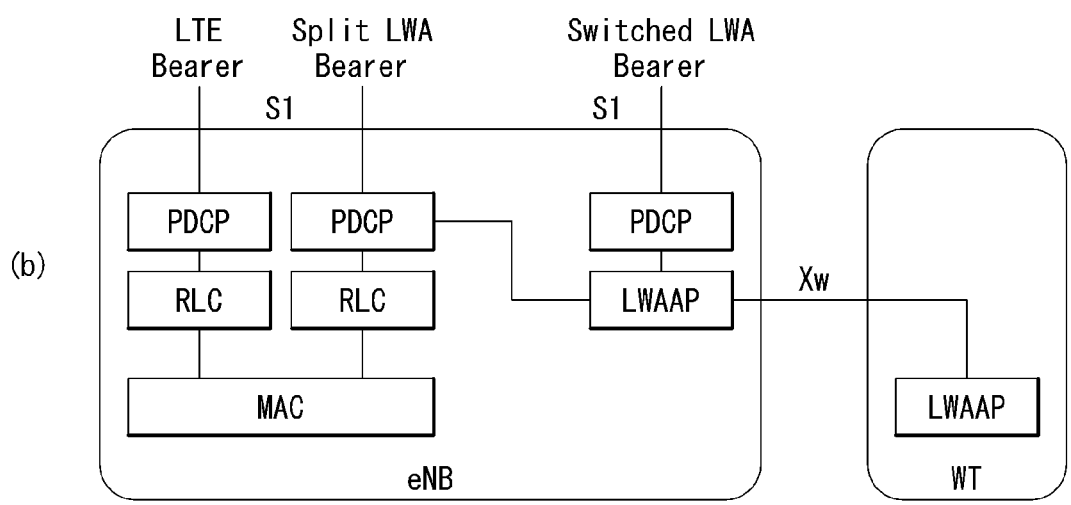
(b)

FIG. 8
(a)
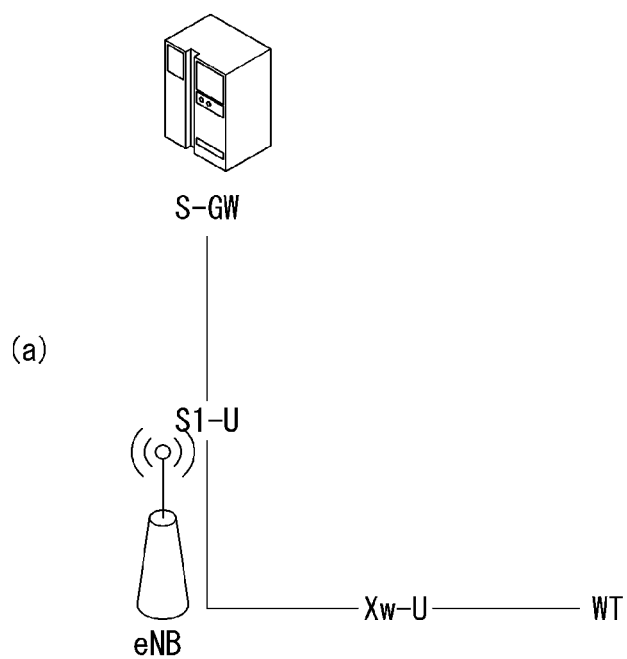
(b)
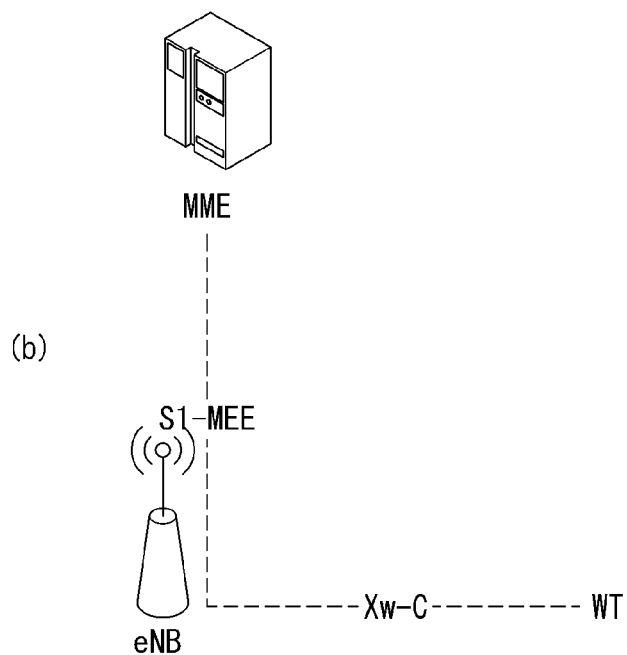

FIG. 9
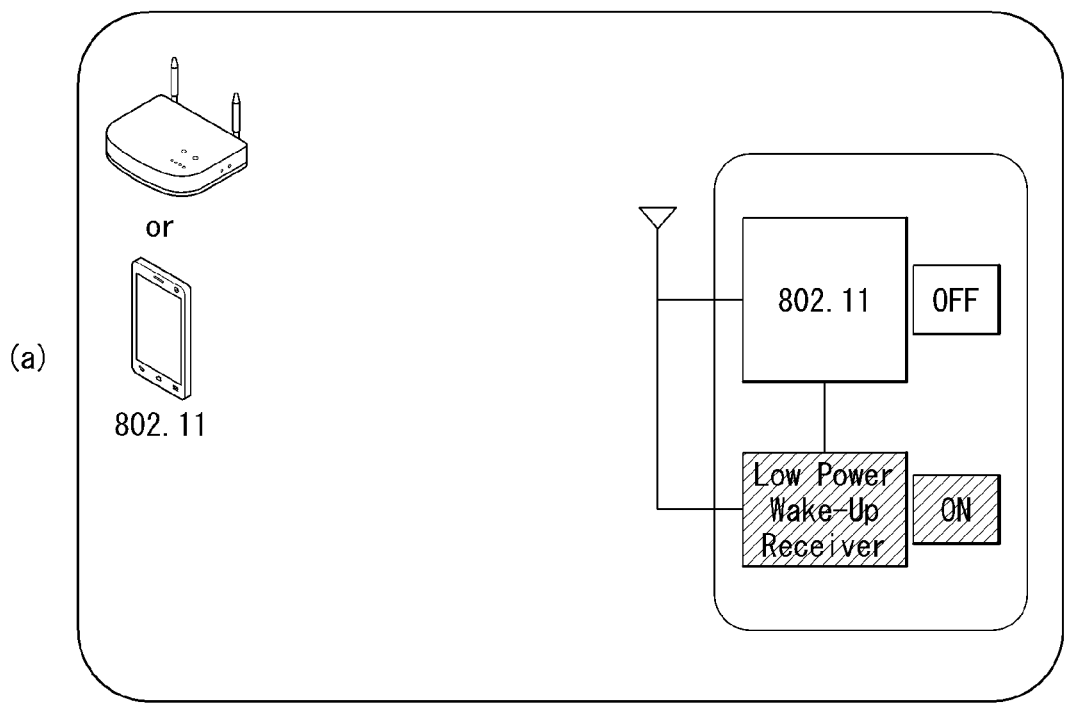
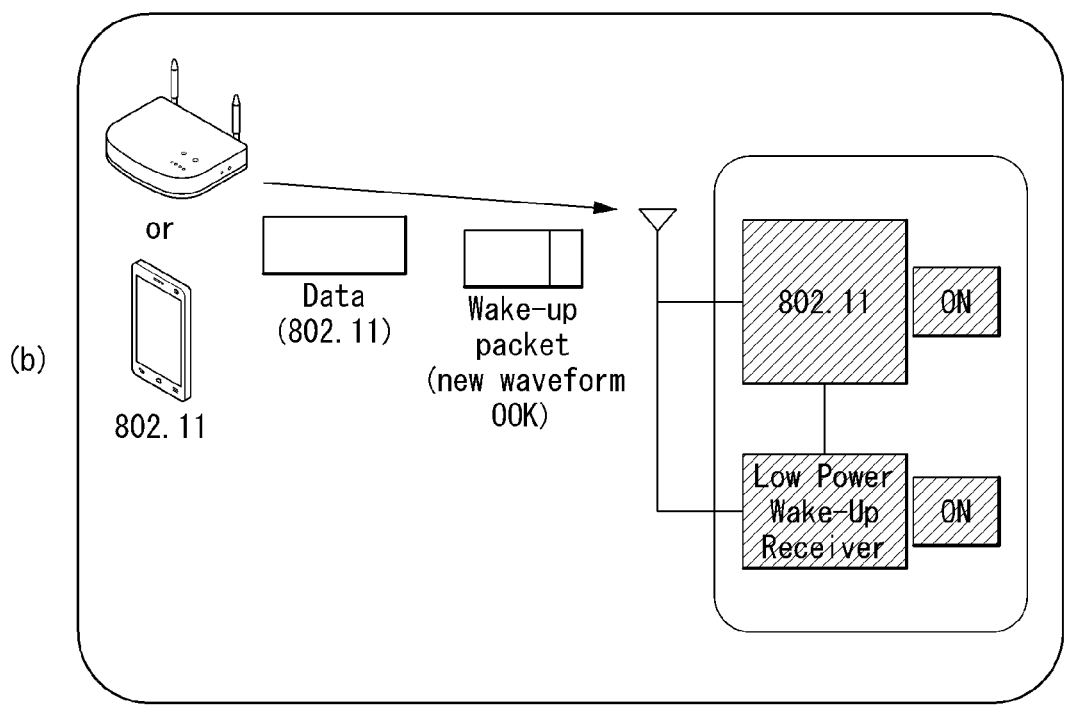

FIG. 10
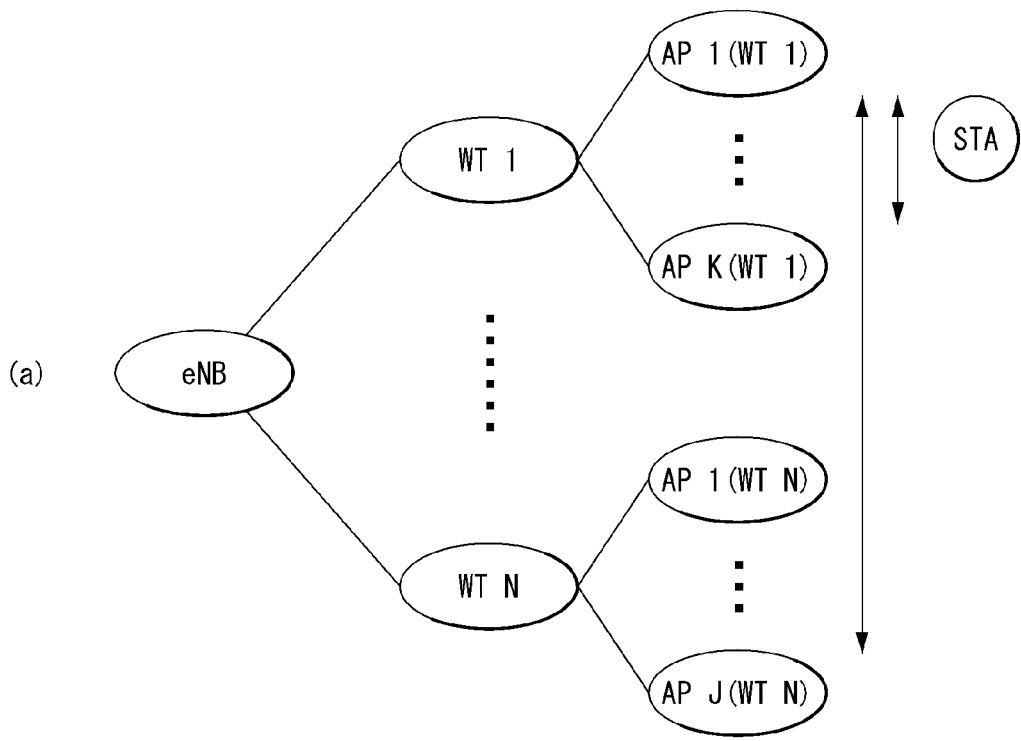
(a)
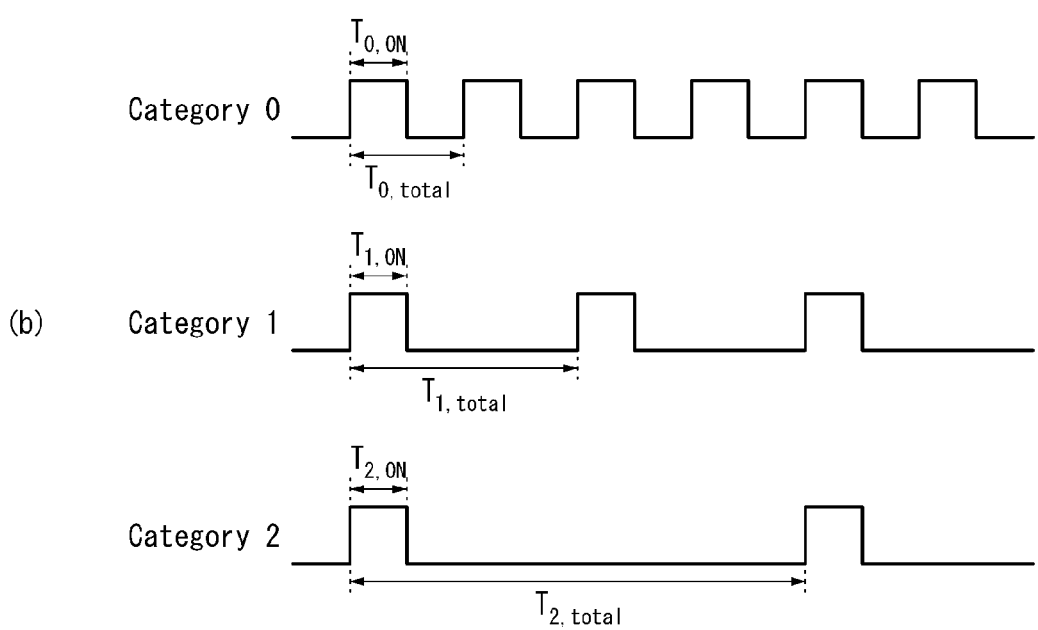
(b)

METHOD AND APPARATUS FOR TRANSMITTING AND RECEIVING A WAKE-UP SIGNAL IN A WIRELESS COMMUNICATION SYSTEM

CROSS-REFERENCE TO RELATED APPLICATIONS

This application is the National Stage filing under 35 U.S.C. 371 of International Application No. PCT/KR2017/015558, filed on Dec. 27, 2017, which claims the benefit of U.S. Provisional Application No. 62/487,984, filed on Apr. 20, 2017, and 62/536,428, filed on Jul. 24, 2017, the contents of which are all hereby incorporated by reference herein in their entirety.

TECHNICAL FIELD

The present invention relates to a method for transmitting and receiving a wake-up signal in a wireless communication system and, more particularly, to a method and apparatus for transmitting and receiving the wake-up signal in LTE WLAN Aggregation (LWA).

BACKGROUND ART

Mobile communication systems have been developed to provide voice services while assuring users' activities and mobility. However, the mobile communication systems have been expanding their areas up to data services as well as voice services, and a current explosive growth of traffic caused a lack of resources, so that users require further advanced mobile communication systems offering quicker services.

As requirements for next-generation mobile communication systems, covering drastically increasing data traffic, a significant increase in transmission rate per user, much more linked devices, very low end-to-end latency, and high energy efficiency should be supported. To this end, various techniques are under research, such as small cell enhancement, dual connectivity, massive MIMO (Multiple Input Multiple Output), in-band full duplex, NOMA (non-orthogonal multiple access), super wideband support including unlicensed bands, or device networking.

DISCLOSURE

Technical Problem

An objective of this specification is to provide a method for transmitting and receiving a wake-up signal in consideration of UE (or STA) movement.

In addition, an objective of this specification is to provide a method of allocating a category related to a power save mode to a UE on the basis of a specific criterion.

Furthermore, an objective of this specification is to provide a method of waking up a main communication module such as a WLAN module in a power save mode of a WUR operation.

Objectives to be achieved in this specification are not limited to the aforementioned advantages, and those skilled in the art to which the present invention pertains may evidently understand other objectives from the following description.

Technical Solution

This specification provides a method for transmitting a wake-up signal in a wireless communication system supporting a wake-up radio (WUR) operation.

The method performed by a network entity comprises transmitting a first wake-up signal for waking up a specific terminal to a specific access point (AP); transmitting a second wake-up signal to all APs within the coverage of the network entity if a response for the first wake-up signal is not received before a first timer expires; and transmitting, to a base station, a response message including control information indicating whether the specific terminal exists, wherein the control information indicates that the specific terminal exists when the response for the second wake-up signal is received before a second timer expires, wherein the control information indicates that the specific terminal does not exist if the response for the second wake-up signal is not received until the second timer expires.

Furthermore, in this specification, the network entity transmits information for a category assigned to the specific terminal to all the APs together with the second wake-up signal.

Furthermore, in this specification, the information for a category includes an on-duration that the wake-up signal is transceived and an off-duration that the wake-up signal is not transceived.

Furthermore, in this specification, the network entity transmits information for a time point at which a category is assigned to the specific terminal to all the APs together with the second wake-up signal.

Furthermore, in this specification, a duty cycle of the category assigned to the specific terminal is changed in units of a predetermined time.

Furthermore, in this specification, the duty cycle includes an on-duration and an off-duration.

Furthermore, in this specification, the first timer is run when the network entity transmits the first wake-up signal.

Furthermore, in this specification, the second timer is run when the network entity transmits the second wake-up signal.

Furthermore, this specification further comprises receiving, from a base station, a first message including a wake-up indication indicating that a main communication module of the specific terminal is waken-up, wherein the received first message includes identification information identifying the specific AP.

Furthermore, in this specification, the method performed by a terminal comprises receiving information for a category related to an operation of the WUR module from a access point (AP), wherein the information for the category includes an on-duration and an off-duration; monitoring the wake up signal during an on-duration of the received category; waking-up a main communication module if the wake-up signal is not received during a predetermined time as a result of the monitoring; and operating in an active mode or a passive mode using the main communication module, wherein the active mode is a mode in which the main communication module transmits a signal including identification information of the terminal to an access point (AP), wherein the passive mode is a mode for receiving a broadcast signal from the AP.

This specification provides further comprises receiving, from the AP, a response for the signal including identification information when operating in the active mode.

Furthermore, this specification further comprises checking whether the AP assigning the category has been changed through the broadcast signal or the response.

Furthermore, this specification further comprises restarting the monitoring of the wake-up signal from a first on-duration of the received category if the AP assigning the category is not changed.

Furthermore, this specification further comprises performing an association with the changed AP if the AP assigning the category is changed; receiving information for a category related to the operation of the WUR module from the changed AP; and monitoring the wake-up signal during an on-duration of a category received from the changed AP.

Furthermore, in this specification, the operation of the WUR module is to receive a wake-up signal in on-duration and not to receive a wake-up signal in off-duration.

Advantageous Effects

According to this specification, it is possible to transmit a wake-up signal to a UE through paging messages of all APs or eNBs in the coverage of a WLAN Termination (WT) even when the UE moves.

In addition, according to this specification, it is possible to provide information related to a category allocated to a UE to correctly transmit a wake-up signal to the UE.

Advantages to be obtained in this specification are not limited to the aforementioned advantages, and those skilled in the art to which the present invention pertains may evidently understand other advantages from the following description.

DESCRIPTION OF DRAWINGS

FIG. 7 is a diagram showing an example of the wireless protocol architecture of the LWA to which an embodiment of the present invention may be applied.

FIG. 8 is a diagram showing an example of the connectivity of an eNB and a WT for the LWA to which an embodiment of the present invention may be applied.

FIG. 9(a) is a schematic diagram showing an example of a wake-up operation proposed by an embodiment of the present invention.

FIG. 9(b) is a schematic diagram showing another example of a wake-up operation proposed by an embodiment of the present invention.

FIG. 10(a) illustrates an example of a logical structure between network entities to which the method proposed herein may be applied.

FIG. 10(b) is a diagram illustrating an example of a category to which the method suggested in the present specification can be applied.

MODE FOR INVENTION

Figure 1:
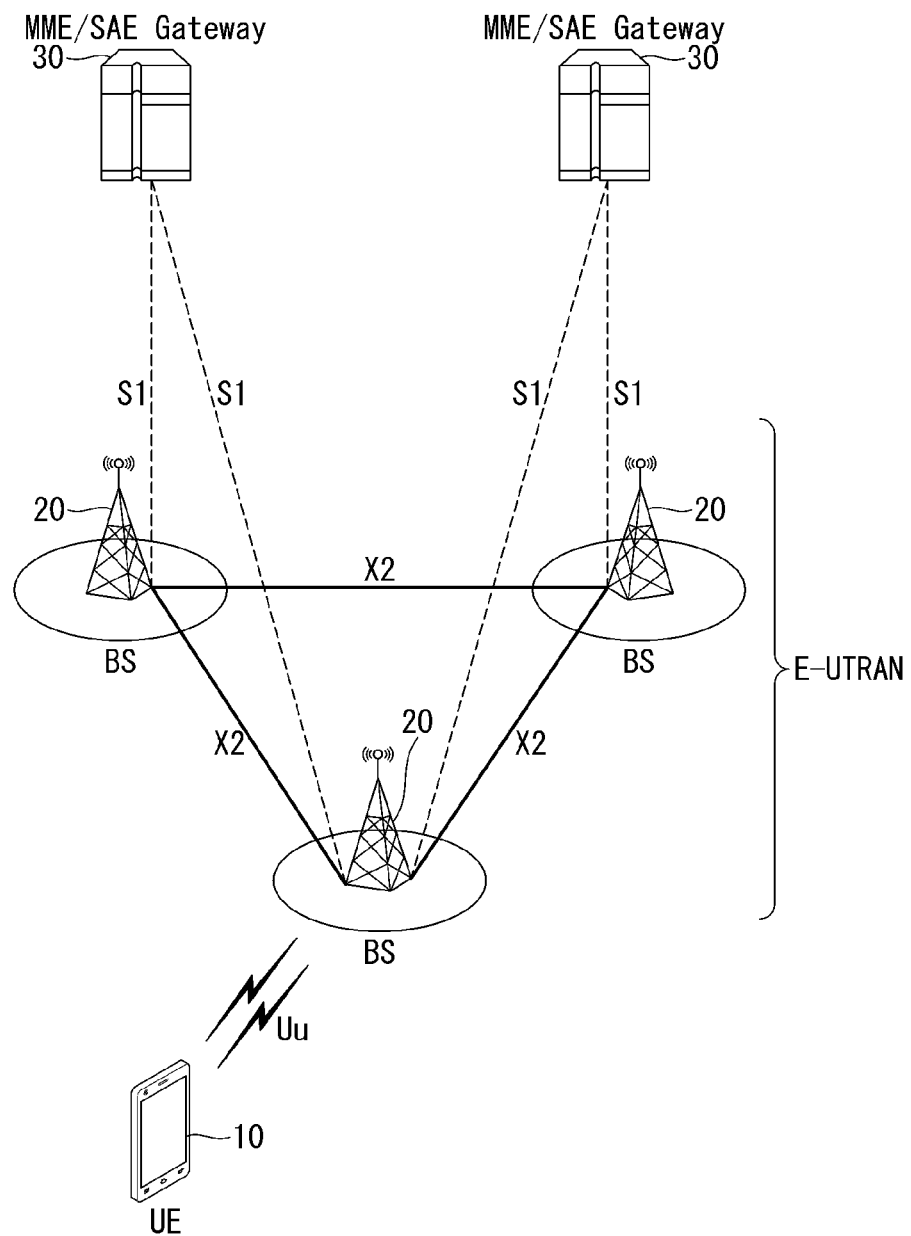
FIG. 1 illustrates a block diagram illustrating network structure of an evolved universal mobile telecommunication system (E-UMTS).

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments may be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the embodiments of the present invention, the enhanced Node B (eNode B or eNB) may be a terminal node of a network, which directly communicates with the terminal. In some cases, a specific operation described as performed by the eNB may be performed by an upper node of the eNB. Namely, it is apparent that, in a network comprised of a plurality of network nodes including an eNB, various operations performed for communication with a terminal may be performed by the eNB, or network nodes other than the eNB. The term "eNB" may be replaced with a term, such as a next generation Node B (gNB), a "fixed station", a "base station (BS)", a "Node B", a "base transceiver system (BTS)", an "access point (AP)", a "macro eNB or master eNB (MeNB)" or a "secondary eNB (SeNB)." The term "UE" may be replaced with a term, such as a "terminal", a "mobile station (MS)", a "user terminal (UT)", a "mobile subscriber station (MSS)", a "subscriber station (SS)", a "station (STA)", an "advanced mobile station (AMS)", a "wireless terminal (WT)", a machine-type communication (MTC) device", a "machine-to-machine (M2M) device", a "device-to-device (D2D) device" or a wireless device.

In the embodiments of the present invention, "downlink (DL)" refers to communication from the eNB to the UE, and "uplink (UL)" refers to communication from the UE to the eNB. In the downlink, transmitter may be a part of eNB, and receiver may be part of UE. In the uplink, transmitter may be a part of UE, and receiver may be part of eNB.

Specific terms used for the embodiments of the present invention are provided to aid in understanding of the present invention. These specific terms may be replaced with other terms within the scope and spirit of the present invention.

The embodiments of the present invention may be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), LTE-Advanced Pro (LTE-A Pro), 5G New Radio (NR), and 3GPP2. Steps or parts that are not described to clarify the technical features of the present invention may be supported by those documents. Furthermore, all terms as set forth herein may be explained by the standard documents.

Techniques described herein may be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), 'non-orthogonal multiple access (NOMA)', etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. LTE-A Pro is an evolution of 3GPP LTE-A. 5G NR is a revolution of 3GPP LTE-A that will be implemented by OFDMA or its variants.

For the purposes of the present invention, the following terms and definitions apply.

Access Control: the process that checks whether a UE is allowed to access and to be granted services in a closed cell.

Carrier frequency: center frequency of the cell.

Cell: combination of downlink and optionally uplink resources. The linking between the carrier frequency of the downlink resources and the carrier frequency of the uplink resources is indicated in the system information transmitted on the downlink resources.

Cell Group: in dual connectivity, a group of serving cells associated with either the MeNB or the SeNB.

DCN-ID: DCN identity identifies a specific dedicated core network (DCN).

Dual Connectivity: mode of operation of a UE in RRC_CONNECTED, configured with a Master Cell Group and a Secondary Cell Group.

Elementary Procedure: XwAP protocol consists of Elementary Procedures (EPs). An XwAP Elementary Procedure is a unit of interaction between an eNB and WT. An EP consists of an initiating message and possibly a response message. Two kinds of EPs are used:
  Class 1: Elementary Procedures with response (success or failure),
  Class 2: Elementary Procedures without response.

E-UTRAN Radio Access Bearer (E-RAB): an E-RAB uniquely identifies the concatenation of an S1 Bearer and the corresponding Data Radio Bearer. When an E-RAB exists, there is a one-to-one mapping between this E-RAB and an EPS bearer of the Non Access Stratum.

Frequency layer: set of cells with the same carrier frequency.

FeMBMS: further enhanced multimedia broadcast multicast service.

Handover: procedure that changes the serving cell of a UE in RRC_CONNECTED.

LTE bearer: in LTE-WLAN Aggregation, a bearer whose radio protocols are located in the eNB only to use eNB radio resources only.

LWA bearer: in LTE-WLAN Aggregation, a bearer whose radio protocols are located in both the eNB and the WLAN to use both eNB and WLAN resources.

LWAAP PDU (Protocol Data Unit): in LTE-WLAN Aggregation, a PDU with DRB (Data Radio Bearer) ID (Identification or IDentifier) generated by LWAAP entity for transmission over WLAN.

Master Cell Group: in dual connectivity, a group of serving cells associated with the MeNB, comprising of the PCell and optionally one or more SCells.

Master eNB: in dual connectivity, the eNB which terminates at least S1-MME (mobility management entity).

MBMS-dedicated cell: cell dedicated to MBMS (multimedia broadcast multicast service) transmission. MBMS-dedicated cell is not supported in this release.

MBMS/Unicast-mixed cell: cell supporting both unicast and MBMS transmissions.

FeMBMS/Unicast-mixed cell: cell supporting MBMS transmission and unicast transmission as SCell.

MCG (Master Cell Group) bearer: in dual connectivity, a bearer whose radio protocols are only located in the MeNB (Master eNB) to use MeNB resources only.

Membership Verification: the process that checks whether a UE is a member or non-member of a hybrid cell.

PLMN ID Check: the process that checks whether a PLMN ID is the RPLMN identity or an EPLMN identity of the UE.

Power saving mode: mode configured and controlled by NAS that allows the UE to reduce its power consumption.

Primary PUCCH group: a group of serving cells including PCell (Primary Cell) whose PUCCH signalling is associated with the PUCCH (Physical Uplink Control Channel) on PCell.

Primary Timing Advance Group: Timing Advance Group containing the PCell. In this specification, Primary Timing Advance Group refers also to Timing Advance Group containing the PSCell unless explicitly stated otherwise.

PUCCH group: either primary PUCCH group or a secondary PUCCH group.

PUCCH SCell: a Secondary Cell configured with PUCCH.

RACH-less HO (Handover)/SeNB (Secondary eNB) change: skipping random access procedure during handover or change of SeNB.

Remote UE: a ProSe-enabled Public Safety UE, that communicates with a PDN (Packet Data Network) via a ProSe UE-to-Network Relay.

SCG (Secondary Cell Group) bearer: in dual connectivity, a bearer whose radio protocols are only located in the SeNB to use SeNB resources.

Secondary Cell Group: in dual connectivity, a group of serving cells associated with the SeNB, comprising of PSCell and optionally one or more SCells.

Secondary eNB: in dual connectivity, the eNB that is providing additional radio resources for the UE but is not the Master eNB.

Secondary PUCCH group: a group of SCells whose PUCCH signalling is associated with the PUCCH on the PUCCH SCell.

Secondary Timing Advance Group: Timing Advance Group containing neither the PCell nor PSCell.

Split bearer: in dual connectivity, a bearer whose radio protocols are located in both the MeNB and the SeNB to use both MeNB and SeNB resources.

Split LWA bearer: in LTE-WLAN Aggregation, a bearer whose radio protocols are located in both the eNB and the WLAN to use both eNB and WLAN radio resources.

Switched LWA bearer: in LTE-WLAN Aggregation, a bearer whose radio protocols are located in both the eNB and the WLAN but uses WLAN radio resources only.

Timing Advance Group: a group of serving cells that is configured by RRC and that, for the cells with an UL configured, use the same timing reference cell and the same Timing Advance value.

WLAN Termination: the logical node that terminates the Xw interface on the WLAN side.

FIG. 1 is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 1, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

An eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signalling to eNodeBs 20, NAS signalling security, AS Security control, Inter CN node signalling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBRFor clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

Figure 2:
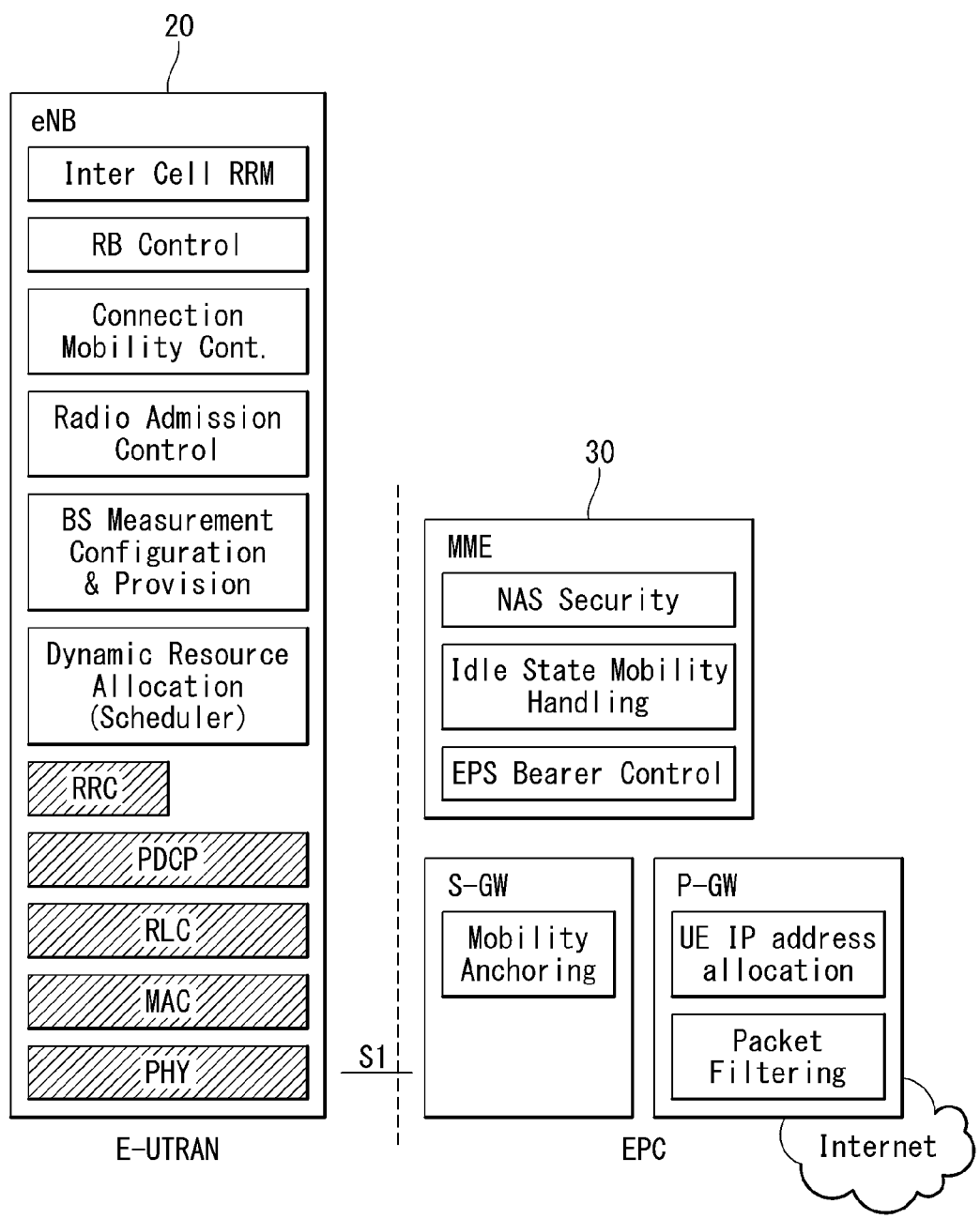
FIG. 2 illustrates a block diagram depicting architecture of a typical E-UTRAN and a typical EPC.

FIG. 2 is a block diagram depicting architecture of a typical E-UTRAN and a typical EPC. As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

Figure 3:
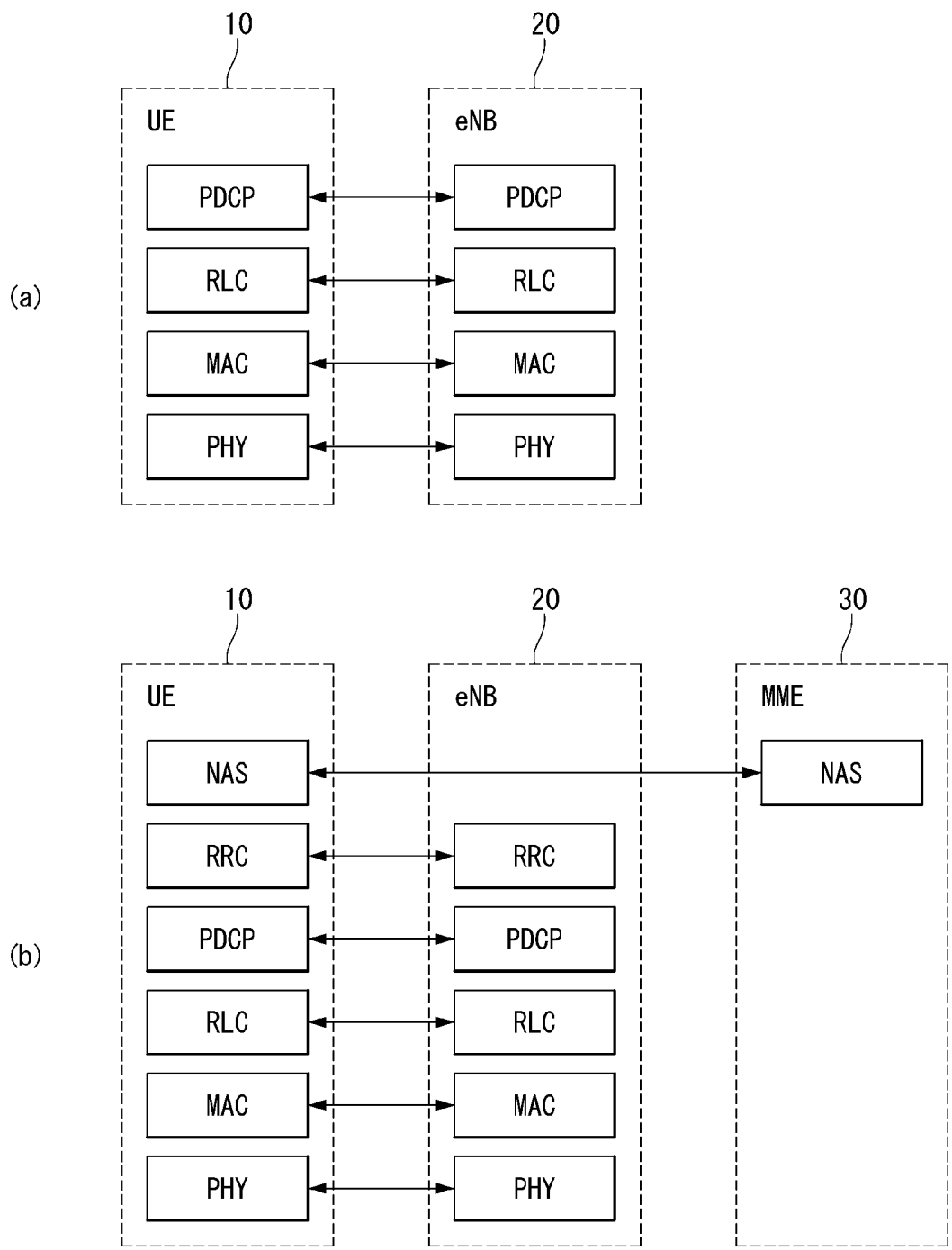
FIG. 3(a) illustrates the user-plane protocol for the E-UMTS.
FIG. 3(b) illustrates the control-plane protocol stack for the E-UMTS

FIGS. 3(a) and 3(b) are block diagrams depicting the user-plane protocol and the control-plane protocol stack for the E-UMTS. As illustrated, the protocol layers may be divided into a first layer (L1), a second layer (L2) and a third layer (L3) based upon the three lower layers of an open system interconnection (OSI) standard model that is well known in the art of communication systems.

The physical layer, the first layer (L1), provides an information transmission service to an upper layer by using a physical channel. The physical layer is connected with a medium access control (MAC) layer located at a higher level through a transport channel, and data between the MAC layer and the physical layer is transferred via the transport channel Between different physical layers, namely, between physical layers of a transmission side and a reception side, data is transferred via the physical channel.

The MAC layer of Layer 2 (L2) provides services to a radio link control (RLC) layer (which is a higher layer) via a logical channel. The RLC layer of Layer 2 (L2) supports the transmission of data with reliability. It should be noted that the RLC layer illustrated in FIGS. 3(a) and 3(b) is depicted because if the RLC functions are implemented in and performed by the MAC layer, the RLC layer itself is not required. The PDCP layer of Layer 2 (L2) performs a header compression function that reduces unnecessary control information such that data being transmitted by employing Internet protocol (IP) packets, such as IPv4 or IPv6, can be efficiently sent over a radio (wireless) interface that has a relatively small bandwidth.

A radio resource control (RRC) layer located at the lowest portion of the third layer (L3) is only defined in the control plane and controls logical channels, transport channels and the physical channels in relation to the configuration, reconfiguration, and release of the radio bearers (RBs). Here, the RB signifies a service provided by the second layer (L2) for data transmission between the terminal and the UTRAN.

As illustrated in FIG. 3(a), the RLC and MAC layers (terminated in an eNodeB 20 on the network side) may perform functions such as Scheduling, Automatic Repeat Request (ARQ), and Hybrid Automatic Repeat Request (HARQ). The PDCP layer (terminated in eNodeB 20 on the network side) may perform the user plane functions such as header compression, integrity protection, and ciphering.

As illustrated in FIG. 3(b), the RLC and MAC layers (terminated in an eNodeB 20 on the network side) perform the same functions for the control plane. As illustrated, the RRC layer (terminated in an eNodeB 20 on the network side) may perform functions such as broadcasting, paging, RRC connection management, Radio Bearer (RB) control, mobility functions, and UE measurement reporting and controlling.

The NAS control protocol (terminated in the MME of gateway 30 on the network side) may perform functions such as a SAE bearer management, authentication, LTE_IDLE mobility handling, paging origination in LTE_IDLE, and security control for the signaling between the gateway and UE 10.

The RRC state may be divided into two different states such as a RRC_IDLE and a RRC_CONNECTED. In RRC_IDLE state, the UE 10 may receive broadcasts of system information and paging information while the UE specifies a Discontinuous Reception (DRX) configured by NAS, and the UE has been allocated an identification (ID) which uniquely identifies the UE in a tracking area and may perform PLMN selection and cell re-selection. Also, in RRC-IDLE state, no RRC context is stored in the eNodeB.

In RRC_CONNECTED state, the UE 10 has an E-UTRAN RRC connection and a context in the E-UTRAN, such that transmitting and/or receiving data to/from the network (eNodeB) becomes possible. Also, the UE 10 can report channel quality information and feedback information to the eNodeB.

In RRC_CONNECTED state, the E-UTRAN knows the cell to which the UE 10 belongs. Therefore, the network can transmit and/or receive data to/from UE 10, the network can control mobility (handover and inter-RAT cell change order to GERAN with NACC) of the UE, and the network can perform cell measurements for a neighboring cell.

In RRC_IDLE mode, the UE 10 specifies the paging DRX (Discontinuous Reception) cycle. Specifically, the UE 10 monitors a paging signal at a specific paging occasion of every UE specific paging DRX cycle.

The paging occasion is a time interval during which a paging signal is transmitted. The UE 10 has its own paging occasion.

A paging message is transmitted over all cells belonging to the same tracking area. If the UE 10 moves from one tracking area to another tracking area, the UE will send a tracking area update message to the network to update its location.

Figure 4:
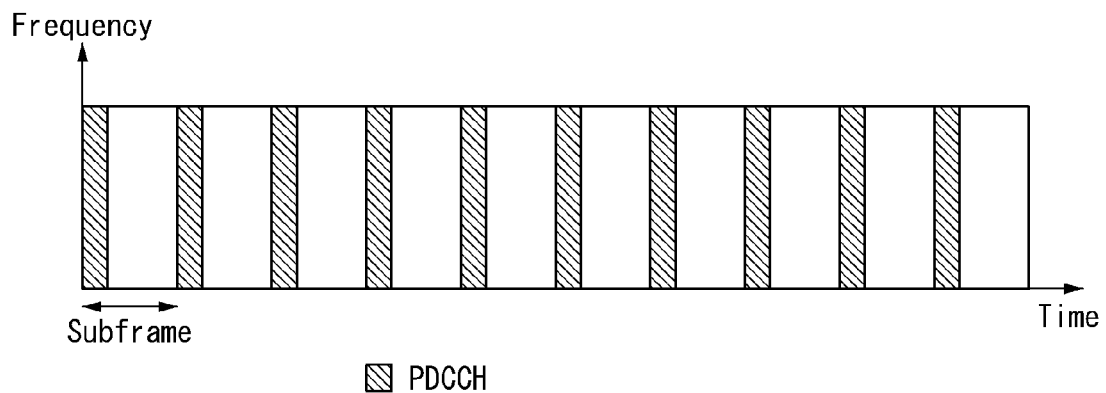
FIG. 4 illustrates a Structure of the physical channel.

A physical channel transfers signaling and data between layer L1 of a UE and eNB. As illustrated in FIG. 4, the physical channel transfers the signaling and data with a radio resource, which consists of one or more sub-carriers in frequency and one more symbols in time.

One sub-frame, which is 1.0 ms. in length, consists of several symbols. The particular symbol(s) of the sub-frame, such as the first symbol of the sub-frame, can be used for downlink control channel (PDCCH). PDCCHs carries dynamic allocated resources, such as PRBs and MCS.

A transport channel transfers signaling and data between the L1 and MAC layers. A physical channel is mapped to a transport channel.

Downlink transport channel types include a Broadcast Channel (BCH), a Downlink Shared Channel (DL-SCH), a Paging Channel (PCH) and a Multicast Channel (MCH). The BCH is used for transmitting system information. The DL-SCH supports HARQ, dynamic link adaptation by varying the modulation, coding and transmit power, and both dynamic and semi-static resource allocation. The DL-SCH also may enable broadcast in the entire cell and the use of beamforming.

The PCH is used for paging a UE. The MCH is used for multicast or broadcast service transmission.

Uplink transport channel types include an Uplink Shared Channel (UL-SCH) and Random Access Channel(s) (RACH). The UL-SCH supports HARQ and dynamic link adaptation by varying the transmit power and potentially modulation and coding. The UL-SCH also may enable the use of beamforming. The RACH is normally used for initial access to a cell.

The MAC sublayer provides data transfer services on logical channels. A set of logical channel types is defined for different data transfer services offered by MAC. Each logical channel type is defined according to the type of information transferred.

Logical channels are generally classified into two groups. The two groups are control channels for the transfer of control plane information and traffic channels for the transfer of user plane information.

Control channels are used for transfer of control plane information only. The control channels provided by MAC include a Broadcast Control Channel (BCCH), a Paging Control Channel (PCCH), a Common Control Channel (CCCH), a Multicast Control Channel (MCCH) and a Dedicated Control Channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by MAC include a Dedicated Traffic Channel (DTCH) and a Multicast Traffic Channel (MTCH). The DTCH is a point-to-point channel, dedicated to one UE for the transfer of user information and can exist in both uplink and downlink.

The MTCH is a point-to-multipoint downlink channel for transmitting traffic data from the network to the UE.

Uplink connections between logical channels and transport channels include a DCCH that can be mapped to UL-SCH, a DTCH that can be mapped to UL-SCH and a CCCH that can be mapped to UL-SCH. Downlink connections between logical channels and transport channels include a BCCH that can be mapped to BCH or DL-SCH, a PCCH that can be mapped to PCH, a DCCH that can be mapped to DL-SCH, and a DTCH that can be mapped to DL-SCH, a MCCH that can be mapped to MCH, and a MTCH that can be mapped to MCH.

It is known that different cause values may be mapped on the signature sequence used to send messages between a UE and eNB and that either Channel Quality Indicator (CQI) or path loss and cause or message size are candidates for inclusion in the initial preamble.

Figure 5:
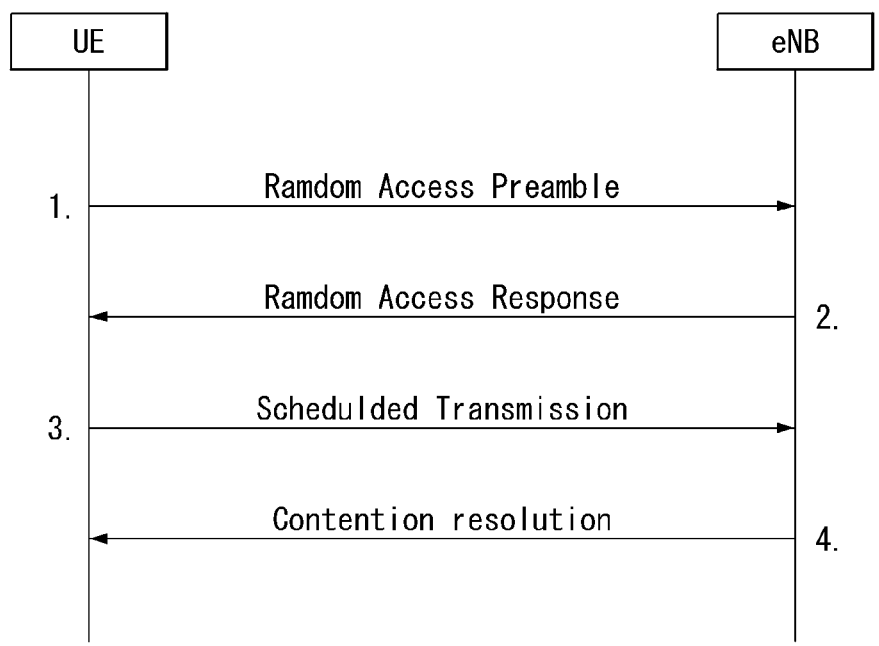
FIG. 5 illustrates a Random Access procedure for E-UTRAN initial access.

FIG. 5 illustrates different messages exchanged between a UE and eNB during initial access.

When a UE wishes to access the network and determines a message to be transmitted, the message may be linked to a purpose and a cause value may be determined. The size of the ideal message number 3 illustrated in FIG. 5 may also be determined by identifying all optional information and different alternative sizes, such as by removing optional information, or an alternative "scheduling request" message may be used.

The UE acquires necessary information for the transmission of the preamble, UL interference, Pilot Transmit power and required Signal-to-Noise Ratio (SNR) for the preamble detection at the receiver or combinations thereof. This information must allow the calculation of the initial transmit power of the preamble. It is beneficial to transmit the uplink message in the vicinity of the preamble from a frequency point of view in order to ensure that the same channel is used for the transmission of the message.

The UE should take into account the uplink interference and the uplink path loss in order to ensure that the network receives the preamble with a minimum SNR. The uplink interference can be determined only in the ENodeB and, therefore, must be broadcast by the ENodeB and received by the UE prior to the transmission of the preamble.

The uplink path loss can be considered to be similar to the downlink path loss and can be estimated by the UE from the received Rx (receiver) signal strength when the transmit power of some pilot sequence of the cell is known to the UE.

The required uplink SNR for the detection of the preamble would typically depend on the NodeB configuration, such as a number of Rx antennas and receiver performance.

There may be advantages to transmitting the rather static Transmit power of the pilot and the necessary uplink SNR separately form the varying uplink interference and possibly the power offset required between the preamble and the message.

The initial transmission power of the preamble can be roughly calculated according to the following formula:

Transmit power=TransmitPilot−RxPilot+ULInterference+Offset+SNRRequired.

Therefore, any combination of SNRRequired, ULInterference, TransmitPilot and Offset can be broadcast. In principle, only one value must be broadcast. This is essentially the method in current UMTS systems, although the UL interference in LTE will mainly be neighboring cell interference that is probably more constant than in UMTS.

The UE determines the initial uplink transmit power for the transmission of the preamble as explained above. The receiver in the eNB is able to estimate the absolute received power as well as the relative received power compared to the interference in the cell. The eNB will consider a preamble detected if the received signal power compared to the interference is above an eNB known threshold.

The UE performs power ramping in order to ensure that a UE can be detected even if the initially estimated transmission power for the preamble is not adequate. Another preamble will most likely be transmitted if no acknowledgement or a negative acknowledgement is received by the UE before the next random access attempt. The transmit power of the preamble can be increased, and/or the preamble can be transmitted on a different uplink frequency in order to increase the probability of detection.

Therefore, the actual transmit power of the preamble that will be detected does not necessarily correspond to the initial transmit power of the preamble as initially calculated by the UE.

The UE must determine the possible uplink transport format.

The transport format, which may include Modulation and Coding Scheme (MCS) and a number of resource blocks that should be used by the UE, depends mainly on two parameters, specifically the SNR at the eNB and the required size of the message to be transmitted.

In practice, a maximum UE message size, or payload, and a required minimum SNR correspond to each transport format. In UMTS, the UE determines before the transmission of the preamble whether a transport format can be chosen for the transmission according to the estimated initial preamble transmit power, the required offset between preamble and the transport block, the maximum allowed or available UE transmit power, a fixed offset and additional margin. The preamble in UMTS need not contain any information regarding the transport format selected by the UE since the network does not need to reserve time and frequency resources and, therefore, the transport format is indicated together with the transmitted message.

The eNB must be aware of the size of the message that the UE intends to transmit and the SNR achievable by the UE in order to select the correct transport format upon reception of the preamble and then reserve the necessary time and frequency resources. Therefore, the eNB cannot estimate the SNR achievable by the UE according to the received preamble because the UE transmit power compared to the maximum allowed or possible UE transmit power is not known to the eNB, given that the UE will most likely consider the measured path loss in the downlink or some equivalent measure for the determination of the initial preamble transmission power.

The eNB could calculate a difference between the path loss estimated in the downlink compared and the path loss of the uplink. However, this calculation is not possible if power ramping is used and the UE transmit power for the preamble does not correspond to the initially calculated UE transmit power.

Furthermore, the precision of the actual UE transmit power and the transmit power at which the UE is intended to transmit is very low. Therefore, it has been proposed to code the path loss or CQI estimation of the downlink and the message size or the cause value in the uplink in the signature.

Figure 6:
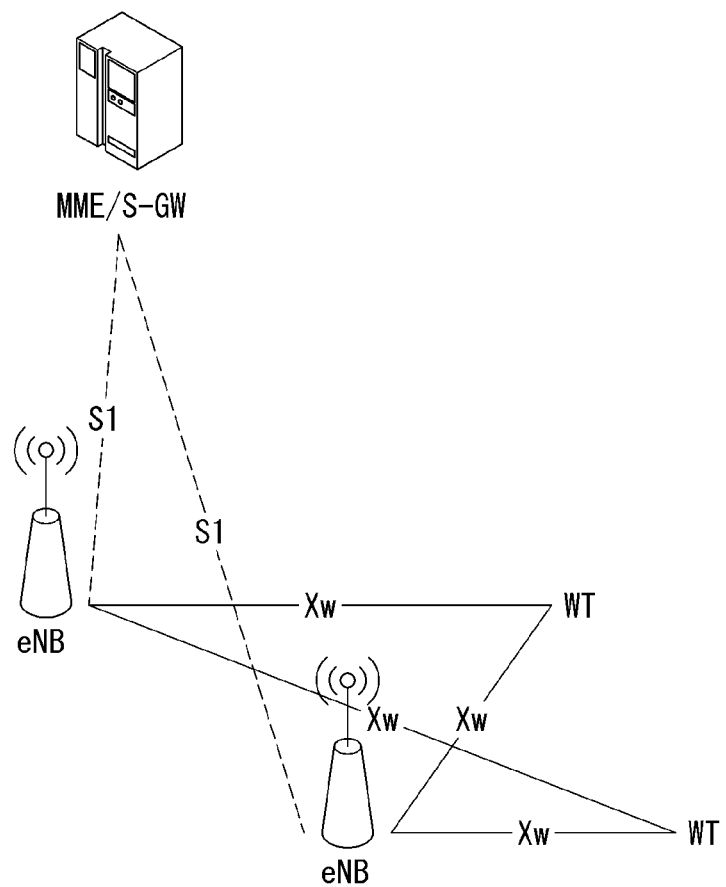
FIG. 6 is a diagram showing an example of the network configuration of an LTE WLAN aggregation (LWA) to which an embodiment of the present invention may be applied.

FIG. 6 is a diagram showing an example of the network configuration of an LTE WLAN aggregation (LWA) to which an embodiment of the present invention may be applied.

A tremendous increase of mobile data traffics has been witnessed due to proliferation of advanced wireless networks, e.g., long-term evolution (LTE) and long-term evolution advanced (LTE-Advanced) networks and smart devices, e.g., smart phones, and tablets.

New services and applications will be kept being introduced based on those successful technological achievements, thus there is no doubt that the trend in mobile traffic increase will require major breakthroughs in near future. Even though advances in cellular technology, e.g., LTE, LTE-Advanced, etc., have enhanced the performance and capacity of mobile networks, it will not be sufficient to meet the mobile data demand with exponential growth rate.

The usage of unlicensed spectrum provides an attractive opportunity for operators to help support their subscribers by increasing network data capacity.

Recent research and development (R&D) and standardization efforts have been focused to aggregate heterogeneous LTE and LTE-Advanced networks, and wireless local area network (WLAN) so as to provide increased throughput using unlicensed spectrum and relieve congestion by offloading of cellular data through WLAN.

Two interworking features are defined in 3GPP: LTE WLAN Aggregation (LWA) and LTE WLAN Radio Level Integration with IPsec Tunnel (LWIP).

In LWA, data aggregation is performed at the radio access network where eNB schedules packets to be transmitted on LTE and WLAN radio links. The advantage of data aggregation at the radio access network (RAN) is that no changes in core network are needed. Main difference between LWA and LWIP lies in who has the control of WLAN.

In LWA, cellular operators have control on WLAN, while customers other than operators have the control of WLAN in LWIP.

E-UTRAN supports LTE-WLAN aggregation (LWA) operation whereby a UE in RRC_CONNECTED is configured by the eNB to utilize radio resources of LTE and WLAN. Two scenarios are supported depending on the backhaul connection between LTE and WLAN:

non-collocated LWA scenario for a non-ideal backhaul;
collocated LWA scenario for an ideal/internal backhaul;

As shown in FIG. 6, the LWA network includes a WLAN termination (WT) unlike LTE or LTE-A. An eNB and a WT are connected through an Xw interface, that is, a new interface, for control information and data transmission/reception. A WLAN Termination (WT) terminates the Xw interface for a WLAN.

In this case, the WT may be defined as follows.

WT: handles multiple APs, forward data to which AP; WT also notifies eNB that a served terminal has WUR (Wake-Up Receiver). eNB asks WT to wake up the terminal through a related AP in which the terminal is associated.

In an embodiment of the present invention, a WT may be included in an eNB or an AP. That is, the function of the WT may be performed by the eNB or the AP.

FIG. 7 is a diagram showing an example of the wireless protocol architecture of an LTE WLAN aggregation (LWA) to which an embodiment of the present invention may be applied.

In LWA, the radio protocol architecture that a particular bearer uses depends on the LWA backhaul scenario and how the bearer is set up. Two bearer types exist for LWA: split LWA bearer and switched LWA bearer.

The split LWA bearer may transfer LTE data and Wi-Fi data to an RLC layer or an LWAAP layer. That is, the split LWA bearer transfers received LTE data to the RLC layer when the LTE data is received from a higher layer and transfers received Wi-Fi data to the LWAAP layer when the Wi-Fi data is received from a higher layer.

FIG. 7(a) shows an example of LWA wireless protocol architecture for a collocated scenario, and FIG. 7(b) shows an example of LWA wireless protocol architecture for a non-collocated scenario.

For PDUs sent over WLAN in LWA operation, the LTE-WLAN Aggregation Adaptation Protocol (LWAAP) entity generates LWAAP PDU containing a dedicated radio bearer (DRB) identity and the WT uses the LWA EtherType 0x9E65 for forwarding the data to the UE over WLAN. The UE uses the LWA EtherType to determine that the received PDU belongs to an LWA bearer and uses the DRB identity to determine to which LWA bearer the PDU belongs to.

In the downlink, the PDCP sublayer of the UE supports in-sequence delivery of upper layer PDUs based on the reordering procedure introduced for DC. In the uplink, PDCP PDUs can only be sent via the LTE.

The UE supporting LWA may be configured by the eNB to send PDCP status report or LWA status report, in cases where feedback from WT is not available.

Only RLC AM can be configured for an LWA bearer.

E-UTRAN does not configure LWA with DC, LWIP or RAN Controlled LTE-WLAN Interworking (RCLWI) simultaneously for the same UE.

If LWA- and RAN-assisted WLAN interworkings are simultaneously configured for the same UE, in RRC Connected, the UE only applies LWA.

For LWA bearer UL configuration, if the data available for transmission is equal to or exceeds the threshold indicated by E-UTRAN the UE decides which PDCP PDUs are sent over WLAN or LTE. If the data available is below the threshold, the UE transmits PDCP PDUs on LTE or WLAN as configured by E-UTRAN.

For each LWA DRB, E-UTRAN may configure the IEEE 802.11 AC value to be used for the PDCP PDUs that are sent over WLAN in the uplink.

For LWA bearer, for routing of UL data over WLAN the WT MAC address may be provided to the UE by the E-UTRAN or using other WLAN procedure.

FIG. 8 is a diagram showing an example of the connectivity of an eNB and a WT for an LTE WLAN aggregation (LWA) to which an embodiment of the present invention may be applied.

FIG. 8(a) shows an example of a network interface in a user plane, and FIG. 8(b) shows an example of a network interface in a control plane.

In the non-collocated LWA scenario, the eNB is connected to one or more WTs via an Xw interface. In the collocated LWA scenario the interface between LTE and WLAN is up to implementation. For LWA, the only required interfaces to the Core Network are S1-U and S1-MME which are terminated at the eNB. No Core Network interface is required for the WLAN.

User Plane

In the non-collocated LWA scenario, the Xw user plane interface (Xw-U) is defined between eNB and WT. The Xw-U interface supports flow control based on feedback from WT.

The Flow Control function is applied in the downlink when an E-RAB is mapped onto an LWA bearer, i.e. the flow control information is provided by the WT to the eNB for the eNB to control the downlink user data flow to the WT for the LWA bearer. The OAM configures the eNB with the information of whether the Xw DL delivery status provided from a connected WT concerns LWAAP PDUs successfully delivered to the UE or successfully transferred toward the UE.

The Xw-U interface is used to deliver LWAAP PDUs between eNB and WT.

For LWA, the S1-U terminates in the eNB and, if Xw-U user data bearers are associated with E-RABs for which the LWA bearer option is configured, the user plane data is transferred from eNB to WT using the Xw-U interface.

FIG. 8(a) shows U-plane connectivity of eNB and WT involved in LWA for a certain UE: the S1-U is terminated at the eNB; the eNB and the WT are interconnected via Xw-U.

Control Plane

In the non-collocated LWA scenario, the Xw control plane interface (Xw-C) is defined between eNB and WT. The application layer signaling protocol is referred to as Xw-AP (Xw Application Protocol).

The Xw-AP protocol supports the following functions:
Transfer of WLAN metrics (e.g., BSS load) from WT to eNB;
Support of LWA for UE in ECM-CONNECTED:
Establishment, Modification and Release of a UE context at the WT;
Control of user plane tunnels between eNB and WT for a specific UE for LWA bearers.

General Xw management and error handling functions:
Error indication;
Setting up the Xw;
Resetting the Xw;
Updating the WT configuration data.

eNB-WT control plane signaling for LWA is performed by means of Xw-C interface signaling.

There is only one S1-MME connection per LWA UE between the eNB and the MME. Respective coordination between eNB and WT is performed by means of Xw interface signaling.

FIG. 8(b) shows C-plane connectivity of eNB and WT involved in LWA for a certain UE: the S1-MME is terminated in eNB; the eNB and the WT are interconnected via Xw-C.

FIG. 9 is a schematic diagram showing an example of a wake-up operation proposed by an embodiment of the present invention.

Referring to FIG. 9, if data is to be transmitted/received using an LWA, only a Wi-Fi module may be activated only when data is generated and the data may be transmitted/received.

Specifically, if data is to be transmitted/received through Wi-Fi, although there is no data transmission/reception, power consumption of a UE is increased if a Wi-Fi module is always activated (or ON). Even though there exist power saving mechanisms, it is wasteful of power when the Wi-Fi module is ON when there is no data to transmit/receive.

Accordingly, in order to reduce power consumption of the UE, there is a need for a method for activating the Wi-Fi module only if data transmission/reception is present and deactivating the Wi-Fi module while there is no data transmission.

Such a method is hereinafter called a wake-up radio (WUR).

In order to apply the WUR method, a UE may include a separate low power module (hereinafter referred to as a "WUR module") for receiving a packet (hereinafter referred to as a "Wake-Up Packet") for activating a WLAN module when the WLAN module is a deactivation state in addition to a WLAN module (or Wi-Fi Module).

The low power module for receiving a Wake-Up Packet may operate in low power (e.g., 100 uW), and may receive a Wake-Up Packet from another device and activate a WLAN module.

A WUR technology is one of the green technologies since it can prevent the waste of power when it is not necessarily required.

WLAN module (or Wi-Fi Module) will totally be turned off when no data is transmitted and received (this status is called "OFF" in which WLAN module (or Wi-Fi Module) is off but WUR module is on).

If there is the data for UE with specific WLAN module identity, for example medium-access control identification (MACID), association identification (AID), then access point (AP) sends "wake-up" signal (or packet) to it before actual data is delivered.

Wake-up module in UE keeps looking for the presence of wake-up signal coming and, if it is detected, then WLAN module will be wake up.

The length of WLAN module "OFF" period in WUR will be much longer than that of sleep-mode currently defined for power saving purpose and thus much power can be saved.

Hereinafter, a method for transmitting and receiving a wake-up signal proposed in this specification will be described in detail with reference to the drawings.

FIG. 10(a) illustrates an example of a logical architecture among network entities to which the method proposed in this specification is applicable.

Referring to FIG. 10(a), one eNB may manage a plurality of WTs and one WT may manage a plurality of APs.

In addition, an STA may move between APs under the control of one WT or between WTs under the control of one eNB.

That is, the STA can move in the coverage areas of APs managed by a WT or move to other WTs.

An STA described in this specification may be a UE, a terminal, a WUR device, a mobile station and the like.

Additionally, a WUR device can operate in a power save mode for further power saving.

The WUR device is an H/W module implemented in an STA and may refer to a WUR module or the STA.

In this manner, the WUR device can be categorized on the basis of specific criteria in order to realize the power save mode.

For example, supported traffic characteristics such as relatively regular traffic versus intermittent traffic and a relatively small amount of data traffic versus a relatively large amount of data traffic may be one of the specific criteria.

Alternatively, the WUR device may be categorized by the class of an STA attached by WUR.

For example, when an STA is premium, a category having a frequent ON duration can be allocated to the STA in order to minimize a delay which can be generated due to use of WUR in the power save mode.

Here, a specific category may have one or more power save modes and one power save mode may include at least one ON duration and at least one OFF duration.

FIG. 10(b) illustrates an example of categories to which the method proposed in this specification are applicable.

Alternatively, the WUR device may be categorized on the basis of power availability.

For example, when an STA is connected to a power outlet, a category having a frequent ON duration can be allocated to the STA because power consumption is less important.

If the STA operates with a battery, a category having an infrequent ON duration may be allocated.

In addition, when conditions used to determine a category are changed, a category allocated to an STA may change depending on the changed conditions.

If an AP wants to change a category allocated to a specific STA, the AP may transmit intention and content (new category related information) to the specific STA when WUR for the specific STA is "ON" state.

Identical or different "ON" durations and/or identical or different "OFF" durations may be allocated to WUR devices in different categories.

"A and/or B" used in this specification can be interpreted as "at least one of A and B is included".

When a plurality of power save modes is defined in the same category, different sets of the power save modes may be defined on the basis of "ON" duration frequency.

For example, one power save mode may have a ratio of "ON" duration to "OFF" duration of 1:2 and another power save mode may have a ratio of "ON" duration to "OFF" duration of 1:3.

A description will be given of a method of waking up a WLAN UE initiated by an eNB.

Here, it is assumed that all of an eNB, a WT (WLAN Termination), an AP and an STA (WLAN terminal) support WUR.

In addition, it is assumed that the eNB is associated with a specific UE.

Accordingly, association means that an AP (belonging to MNO of the mentioned eNB) is associated with an STA.

Further, it is assumed that the STA has a WLAN module (802.11 module) in an OFF mode.

Figure 11:
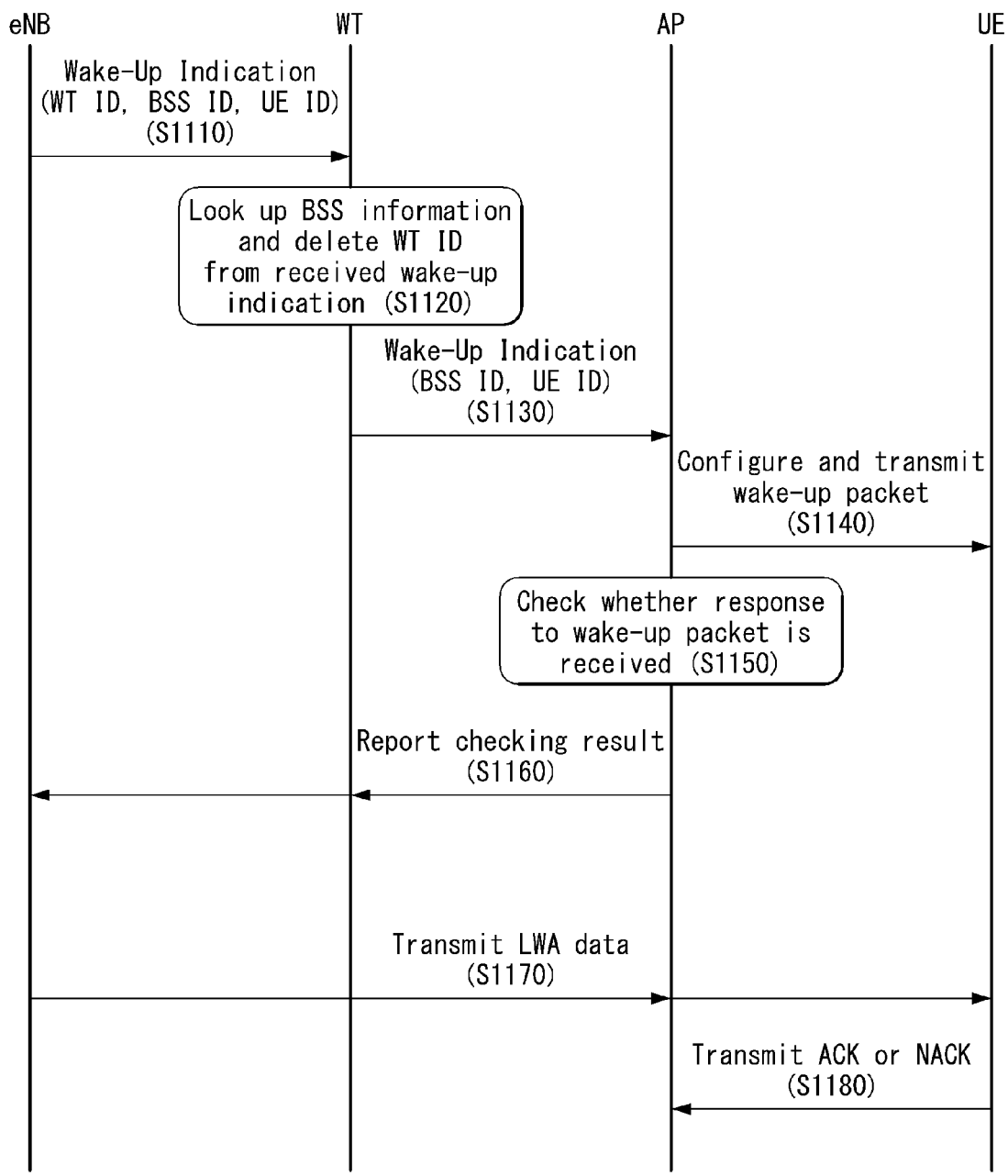
FIG. 11 is a flowchart illustrating an example of a wake-up signal transmission/reception method proposed in the present specification.

FIG. 11 is a flowchart illustrating an example of a method for transmitting and receiving a wake-up signal proposed in this specification.

First, an eNB transmits, to a specific UE, a wake-up indication including at least one of a WT ID (Identification or Identifier), a BSS ID and a UE ID through at least one WT (1110).

The specific UE may refer to a UE corresponding to the UE ID, and the UE ID may be a MAC (Media Access Control) ID or an AID (Association ID) of the specific UE.

Here, the BSS ID may be a MAC ID of an AP, and the MAC ID may be composed of 48 bits.

Then, upon reception of the wake-up indication from the eNB, the WT looks up received BSS (Basic Service Set) information and deletes the WT ID from the received wake-up indication (S1120).

In addition, the WT delivers the wake-up indication process in step S1120 to a BSS identified by the BSS ID (S1130).

The wake-up indication of step S1130 may include at least one of the BSS ID and the UE ID.

Here, the BSS identified by the BSS ID may be represented as a specific AP.

Similarly, the UE ID in step S1130 may be the MAC ID or AID of the UE.

Subsequently, the BSS (or AP) configures a wake-up packet for the UE corresponding to the UE ID and transmits the wake-up packet to the UE (specific UE) corresponding to the UE ID (S1140).

If the AP supports WUR capability, the wake-up indication directed to the specific AP having the BSS ID may be identical to the MAC ID of the AP.

Subsequently, the AP (or delivery AP) transmits one or more wake-up packets and then checks whether a response to the wake-up packets has been received from a WUR device (S1150).

Thereafter, the AP reports the checking result to the eNB through the WT (S1160).

If the AP receives no response to the wake-up packets, the AP may report, to the WT, that there is no UE (i.e., the specific UE is not discovered within the coverage of the AP).

Further, when the WT does not receive the response until a timer operating in the WT expires, the WT may determine that the WUR device is not present in the coverage of the AP after the timer expires.

If the AP receives the response to the wake-up packets, the AP transmits a message including information indicating presence of the specific UE to the eNB through the WT.

Then, the AP receives LWA data from the eNB and transmits the LWA data to the specific UE (S1170).

Subsequently, the specific UE transmits ACK or NACK for the received LWA data to the AP (S1180).

The process described with reference to FIG. 11 will be described in more detail from the viewpoint of operations of network entities.

First, it is assumed that the UE can have preference setting (PREF setting) of a subscriber.

That is, the UE has PREF setting irrespective of whether the subscriber (or user or STA) prefers reception of user data (UP traffic) through a WLAN (mainly through a WLAN or through E-UTRA or NR).

In addition, it is assumed that the WT can maintain a database including power save modes and/or reference times for WUR devices in the coverage areas of APs under the control thereof.

For example, the reference times may refer to a start time of an ON duration or an initial start time of the ON duration.

(Method 1)

The operation of the WT will be described.

The WT can perform the following procedure upon reception of the response to the wake-up indication from the AP or expiration of the timer thereof (irrespective of which one of reception of the response and timer expiration is performed first).

Here, the timer of the WT may be represented as a first timer.

The timer (or first timer) of the WT starts (or operates) when the WT delivers the processed wake-up indication including at least one of the BSS ID and UE ID (MAC ID or AID) to the BSS identified by the BSS ID.

If the WT controls two or more APs, the WT transmits a wake-up request including at least one of the UE ID, WUR device power save mode (category) information and reference time for the corresponding category to the APs and performs the aforementioned steps S1140 to S1160.

That is, the AP configures a wake-up packet for the UE corresponding to the UE ID and transmits the wake-up packet to the UE (specific UE) corresponding to the UE ID.

If the AP supports WUR capability, the wake-up indication directed to the specific AP having the BSS ID may be identical to the MAC ID of the AP.

After the AP transmits one or more wake-up packets, if the AP receives no response to the wake-up packets from the WUR device, the AP may report, to the WT, that the UE is not present (i.e., the specific UE is not discovered in the coverage of the AP).

Alternatively, the WT may determine that the WUR device is not present in the coverage of the AP after the timer operating in the WT expires.

The wake-up request may be transmitted through multicast or broadcast.

If the AP receives a wake-up request having the same UE ID from the WT within a predefined time, the AP discards the wake-up request having the same UE ID. Then, the following operation can be performed.

When the eNB has a plurality of WTs, the eNB reports that the specific UE is not present to an MME if the eNB does not receive a response from an arbitrary WT under the control thereof.

If the AP receives a wake-up request having a new UE ID from the WT, the following operation can be performed.

That is, when no response to the wake-up request is received from any AP under the control of the WT for a specific time (T1 or a second timer operation time), the WT transmits a WLAN UE WAKE-UP REQUEST REJECT message to the eNB.

The specific time may be represented as T1 or a second timer operation time, and the second timer starts or operates when the WT transmits the wake-up request including at least one of the UE ID, WUR device power save mode (category) information and reference time for the corresponding category.

The WLAN UE WAKE-UP REQUEST REJECT message includes at least one of an eNB ID (when two or more eNBs are associated with the WT), WT ID, BSS ID (AP ID), UE ID, power save mode (category) information and reference time information.

The following operations can be considered based on the eNB operation when WLAN UE WAKE-UP REQUEST REJECT message is received from any WT.

Operation 1: When the eNB has a plurality of WTs and receives no response from any WT under the control thereof for a specific time (e.g., T2 or a third timer operation time), the eNB reports that the specific UE is not present to the MME.

Then, the MME configures a paging message and delivers the paging message to a plurality of eNBs.

Operation 2: After the WT transmits the WLAN UE WAKE-UP REQUEST REJECT message to the eNB, the eNB may transmit wake-up indication including at least one of the WT ID, BSS ID (MAC ID of the AP: 48 bits), UE ID (MAC ID or AID), power save mode (category) information and reference time information to the specific UE through the plurality of WTs under the control thereof.

The specific UE refers to a UE corresponding to a UE ID for which WT ID and BSS ID have a multicast or broadcast ID.

Here, when the eNB receives no response from any WT under the control thereof for a specific time (e.g., T2, a third timer) (when the eNB has a plurality of TWs), the eNB reports that the specific UE is not present to the MME.

Then, the MME configures a paging message and delivers the paging message to the plurality of eNBs.

The operation of the UE will be described.

The specific UE receives the paging message from the eNB through an LTE module thereof, and then checks PREF setting.

When PREF setting is "via WLAN", the LTE module of the specific UE wakes up a WLAN module.

The WLAN module is H/W implemented in the specific UE and can execute a LWA function.

Then, the specific UE initiates an authentication and authorization procedure with a new AP.

If PREF setting is not "via WLAN", that is, PREF setting is 'via E-UTRA" or "via NR" (PREF=via E-UTRA, via LTE or via NR), the specific UE may perform the following operation depending on RRC state.

If the specific UE is in an RRC idle mode and ACB (Access Control Barring), ACDC (Application-specific congestion control for data communication) or other access control techniques are configured, the specific UE follows an instruction provided by the eNB through SIB 2.

(Method 2)

When the eNB does not receive a response (positive response, that is, "discovery of the specific UE) from the WT for a specific time (e.g., T2, third timer operation time), the eNB reports absence of the specific UE to the MME.

Then, the MME configures a paging message and delivers the paging message to the plurality of eNBs.

Subsequently, the specific UE checks PREF setting.

If PREF setting is "via WLAN", the specific UE receives the paging message through the LTE module thereof and then wakes up the WLAN module thereof.

If an AP is discovered, the specific UE initiates an authentication and authorization procedure with the new AP (association procedure) through the WLAN module thereof.

When an AP is not discovered and PREF setting is "via E-UTRA", "via LTE" or "via NT", the specific UE performs the following operation depending on RRC state.

When the specific UE is in an RRC idle mode and ACB, ACDC or other access control techniques are configured, the specific UE follows an instruction provided by the eNB through SIB 2.

For additional power saving, an AP can also support WUR capability. In this case, the AP needs to wake up before initiation of data transmission to a UE.

Here, it is assumed that the AP and a WT are wirelessly connected and eNB has a status on AP which is in WUR power save mode or not.

An eNB starts a WLAN AP wake-up process.

The eNB transmits wake-up indication including at least one of a WT ID and a BSS ID (48-bit MAC ID of the AP) to the WT.

The WT configures a wake-up packet including the BSS ID designated in the received wake-up indication to transmit the wake-up packet to the AP.

Upon reception of a wake-up response from the AP, the WT delivers a wake-up confirmation including at least one of the WT ID and the BSS ID (48-bit MAC ID of the AP) to the eNB.

Then, the eNB performs the procedure described above with reference to FIG. 9.

A state of a WLAN UE may be reported through the following method.

A BSS collects information about UEs in an OFF state (i.e., a state in which an 801.11 module is turned off but a WUR module is turned on) under the control thereof.

The BSS transmits the collected information about the UEs to an eNB through a WT (a protocol may exist or may not end in the WT).

Upon reception of the information about the UEs, the eNB can confirm which UE is in the OFF state.

(Method 3)

An AP allocates a specific category to a specific STA (or specific UE).

Allocation of the specific category may be delivered through a unicast or multicast message.

Here, a category may have one or more power save modes, and a power save mode may include at least one ON duration and at least one OFF duration.

Then, the STA initiates the power save mode of a WUR device on the basis of the allocated category.

This operation can be interpreted as an operation of the STA to monitor wake-up signals for the duration of the allocated power save mode.

The STA may start from an initial power save mode state or an arbitrary power save mode state in the category.

That is, one category can have one or more power save modes.

Power save mode states having the same category have a mapped time duration for which a WUR device can remain.

When a time duration of the WUR device in the last power save mode state expires (or the STA receives no wake-up signal for a specific time as a monitoring result), the WUR device of the STA wakes up the main WLAN module of the STA.

Here, the following two scanning methods can be defined.

The first scanning method is passive scanning or a passive mode.

The main WLAN module of the STA identifies an AP upon reception of a beacon (from the AP).

If the AP from which the beacon has been received before the WUR device enters the power save mode is identified as the previous AP, the WUR device maintains the power save mode state (e.g., re-starts from the initial power save mode state).

When the AP from which the beacon has been received before the WUR device enters the power save mode is not the previous AP, the main WLAN module of the STA starts an association procedure with a new AP.

During or after the association procedure, a new category may be allocated to the WUR device.

The second scanning method is active scanning or an active mode.

The main WLAN module of the STA transmits a probe request to an AP and receives a probe response to the probe request from the AP.

Then, the STA confirms identification information (e.g., ID) of the AP upon reception of the probe response.

When the ID of the AP confirmed before the WUR device enters the power save mode is the ID of the previous AP, the WUR device of the STA maintains the power save mode state (e.g., re-starts from the initial mode).

When the identification information (e.g., ID) of the AP confirmed before the WUR device enters the power save mode is not the ID of the previous AP, the main WLAN module of the STA starts an association procedure with a new AP.

During or after the association procedure, a new category may be allocated to the WUR device.

The aforementioned messages are briefly arranged.

The WLAN UE WAKE-UP REQUEST message (S1210) transmitted from the eNB to the WT includes the eNB ID (at least one of the WT ID, BSS ID, UE ID (MAC ID or AID) when one or more eNBs are associated with the WT).

Upon reception of the WLAN UE WAKE-UP REQUEST message, the WT performs the following procedure in the same manner as the method described with reference to FIG. 11.

When an intended UE wakes up by receiving wake-up indication, this means "success" and the WT is notified of "success".

Here, "success" can be transmitted from the WT to the eNB through WLAN UE WAKE-UP REQUEST ACKNOWLEDGE (S1220) and this message may include at least one of an eNB ID (when two or more eNBs are associated with the WT), WT ID, BSS ID and UE ID.

When the BSS does not receive a positive response (i.e., success) although the BSS has transmitted a predefined number of wake-up indications to the intended UE or specific UE, the BSS regards the result as "unsuccess" (or "failure").

In this case, the BSS notifies the WT of "failure".

Here, the failure can be transmitted from the WT to the eNB through WLAN UE WAKE-UP REQUEST REJECT (S1220), and this message may include at least one of an eNB ID (when two or more eNBs are associated with the WT), WT ID, BSS ID and UE ID.

Figure 12:
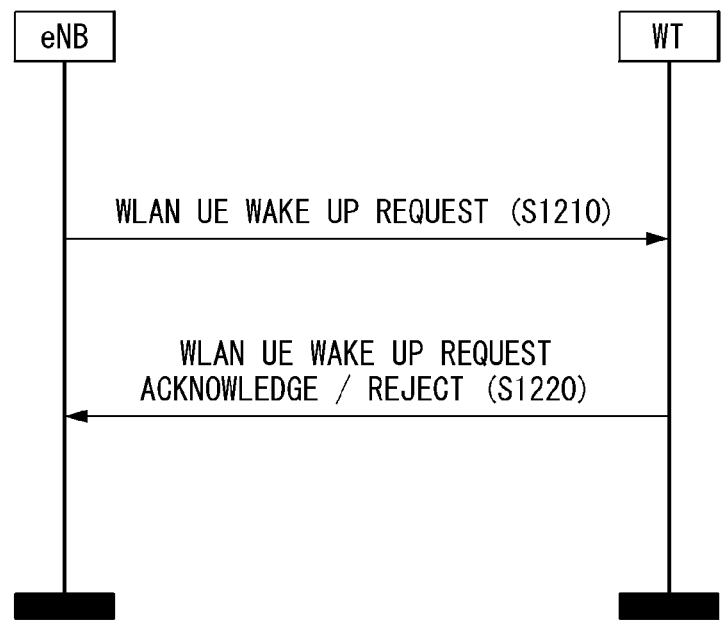
FIG. 12 is a diagram illustrating a method of transmitting and receiving a message indicating a success or failure of a WLAN UE wake up request proposed in the present specification.

FIG. 12 illustrates a method for transmitting and receiving a message indicating success or failure for a WLAN UE wake-up request proposed in this specification.

Next, a WLAN UE OFF INDICATION message transmitted from a WT to an eNB will be described.

The WLAN UE OFF INDICATION message (S1310) may include at least one of an eNB ID (when one or more eNBs are associated with the WT), WT ID, BSS ID and UE ID, and this message may include information indicating that a UE is in an OFF state.

The information indicating that the UE is in an off state is collected by a controlling BSS, and the controlling BSS notifies the WT of the information.

Next, a WLAN UE OFF CONFIRMATION message transmitted from the eNB to the WT will be described.

The WLAN UE OFF CONFIRMATION message (S1320) may include at least one of an eNB ID (when two or more eNBs are associated with the WT) and WT ID and indicates a response message for the WLAN UE OFF INDICATION.

Figure 13:
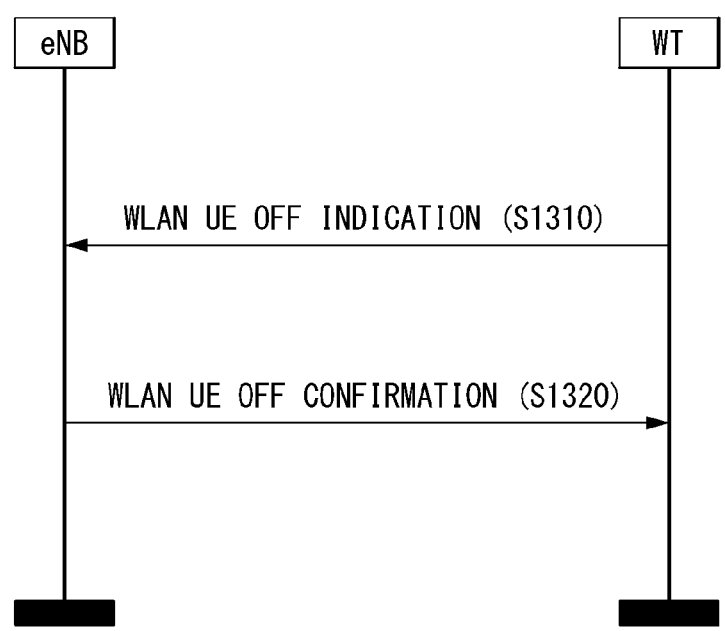
FIG. 13 is a diagram showing information about the OFF state of the UE proposed in the present specification, and a confirmation thereof.

FIG. 13 illustrates information about an OFF state of a UE and confirmation therefor proposed in this specification.

Next, a method for transmitting and receiving state information of a WLAN UE will be described.

A WT reports information about a WLAN UE in an OFF state of a WUR device to an eNB using the WLAN UE OFF INDICATION message of FIG. 13 and an Xw-AP (Uplink Control Plane).

During the aforementioned OFF state related reporting operation, at least one of the UE ID (MAC ID and/or AID), the BSS ID of a BSS to which the UE belongs, and an AP having the BSS ID may also be transmitted.

Downlink traffic (LWA traffic) transmitted to a WLAN UE through an eNB will be described.

The eNB checks whether the UE is in an OFF state (on the basis of a report of a WT).

When the UE is in an OFF state, the eNB transmits wake-up indication (WLAN UE OFF INDICATION) including at least one of a WT ID, BSS ID and UE ID (MAC ID and/or AID) to the WT (to which the BSS of the UE belongs) through the Xw-AP (downlink control plane).

The WT transmits the wake-up indication to the AP having the BSS ID (on the basis of the received WLAN UE OFF INDICATION) and the AP transmits a WUR packet (signal, a wake-up packet as shown in FIG. 13) to the WLAN UE indicated by the UE ID.

Figure 14:
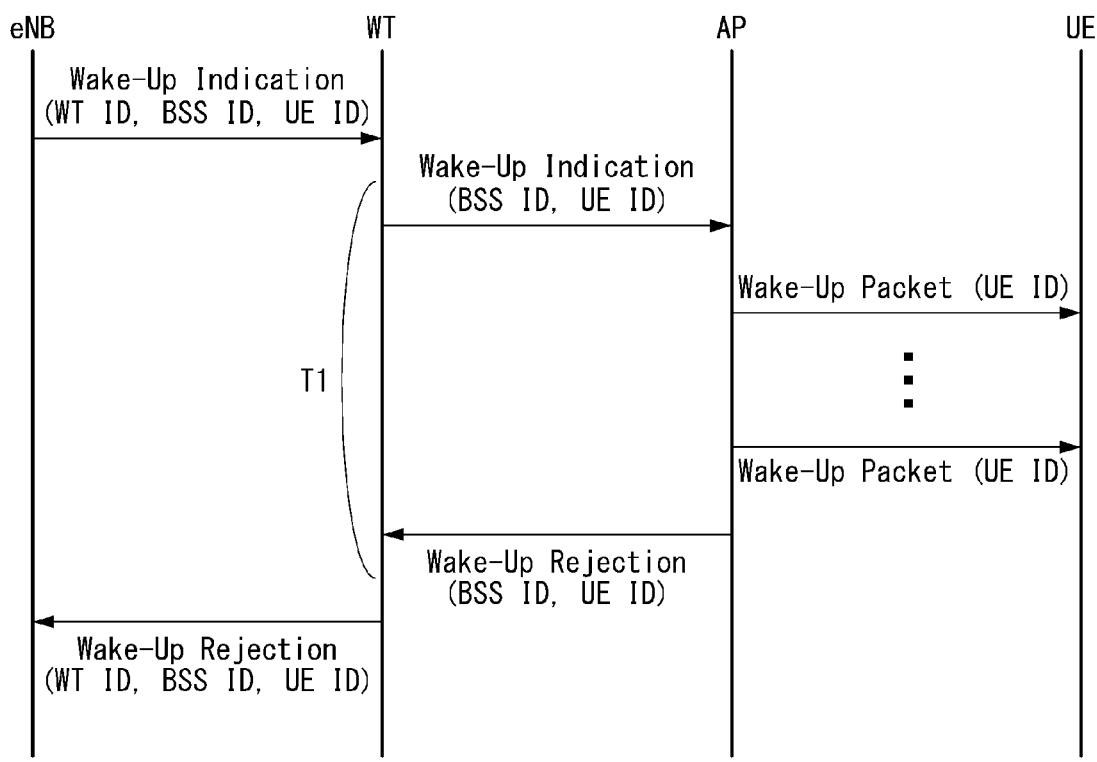
FIG. 14 is a flowchart illustrating another example of a method of transmitting and receiving a wake-up signal proposed in the present specification.

If the AP receives no response from the UE, the AP may repeatedly transmit the WUR packet multiple times, as illustrated in FIG. 14.

If the AP does not receive any response from the UE, that is, if the UE is not discovered, the AP reports absence of the UE to the WT (through the wake-up rejection message of FIG. 14).

When the WT receives information indicating that the UE is not present from the AP or does not receive a response for a specific time T1, the WT reports absence of the UE to the eNB (through the wake-up rejection message of FIG. 14).

When the WT has more than one AP under control, the WT may broadcast wake-up indication to the rest of the AP's.

The eNB can transmit wake-up indication including at least one of the WT ID, AP ID and UE ID to a plurality of WTs under the control thereof in a multicast or broadcast manner.

If any one of the WTs does not receive a response from the UE, the eNB reports absence of the UE to an MME.

Then, the MME configures a paging message and delivers the configured paging message to a plurality of eNBs.

Upon reception of a wake-up request through the WUR packet or the paging message, the UE wakes up the WLAN module thereof and the WLAN module initiates an authentication and association procedure with a new AP.

Upon successful authentication and association with the new AP, the new AP delivers the updated UE state along with at least one of the BSS ID and UE ID to the WT.

Then, the WT delivers the received UE state along with at least one of the WT ID, BSS ID and UE ID to the eNB.

Upon reception of the updated UE state, the eNB changes the UE state information (e.g., from "OFF" to "ON") and transmits LWA traffic to the UE using the Xw-AP (Downlink Data Plane).

FIG. 14 is a flowchart illustrating another example of the method for transmitting and receiving a wake-up signal proposed in this specification.

Figure 15:
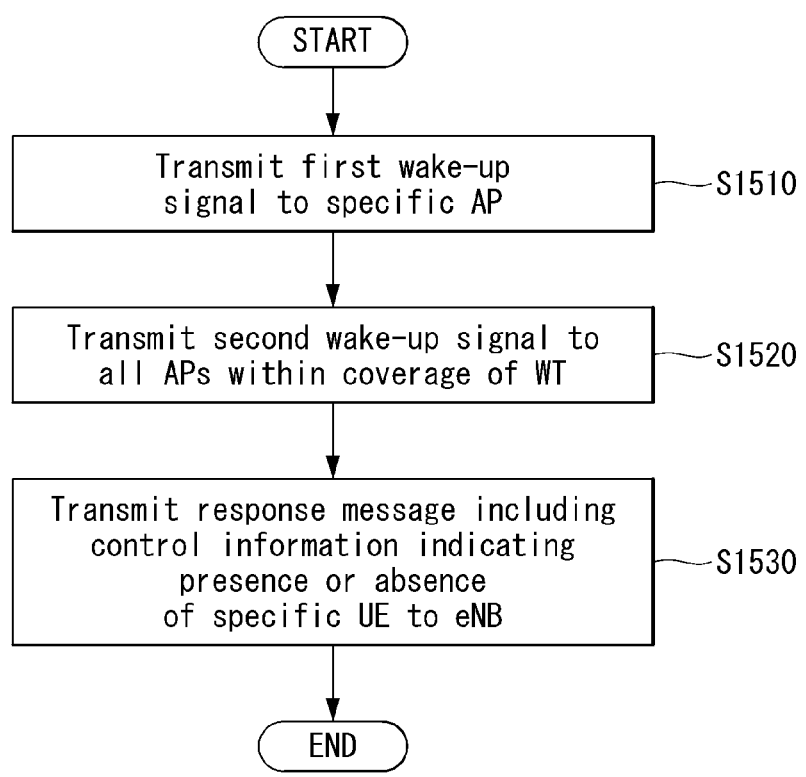
FIG. 15 is a flowchart showing an example of a method of transmitting and receiving a wake-up signal proposed in the present specification.

FIG. 15 is a flowchart illustrating an example of the method for transmitting and receiving a wake-up signal proposed in this specification.

First, a network entity transmits a first wake-up signal for waking up a specific UE to a specific AP (S1510).

Here, it is assumed that the network entity is a WT.

Then, the WT transmits a second wake-up signal to all APs within the coverage of the WT when the WT does not receive a response to the first wake-up signal before a first timer expires (S1520).

The first timer is a timer operating in the WT and can operate when the first wake-up signal is transmitted.

Then, the WT transmits a response message including control information indicating presence or absence of the specific UE to an eNB (S1530).

Here, the control information may indicate presence of the specific UE when a response to the second wake-up signal is received before a second timer expires and indicates absence of the specific UE when a response to the second wake-up signal is not received until the second timer expires.

Here, the second timer may operate when the second wake-up signal is transmitted.

In addition, the WT may transmit information about a category allocated to the specific UE along with the second wake-up signal to all APs.

Here, the information about the category may include an on-duration for which the wake-up signals are transmitted and received and an off-duration for which the wake-up signals are not transmitted and received.

In addition, the WT may transmit information about a time when the category is allocated to the specific UE along with the second wake-up signal to all APs.

This is for the purpose of correctly notifying the APs of wake-up signal transmission time because a duty cycle may change in category.

The duty cycle of the category allocated to the specific UE may change in units of specific time and may include an on-duration and an off-duration.

Additionally, the WT may receive, from the eNB, a first message including wake-up indication which instructs the main communication module of the specific UE to wake up.

Here, the received first message may include identification information for identifying the specific AP and the identification information may be an ID.

Figure 16:
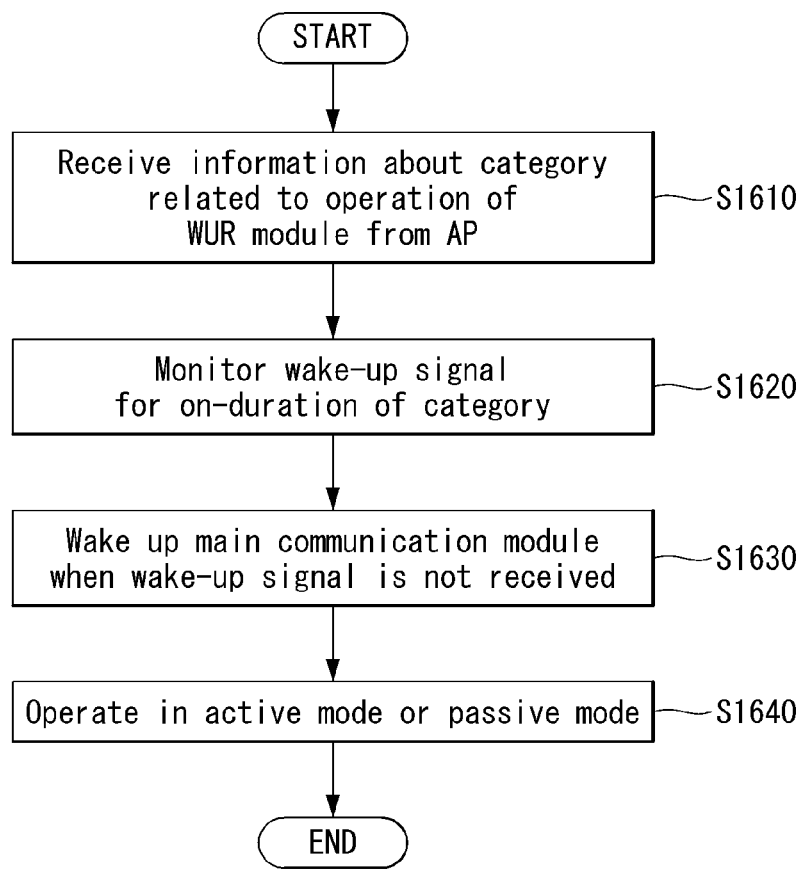
FIG. 16 is a flowchart showing another example of a method of transmitting and receiving a wake-up signal proposed in the present specification.

FIG. 16 is a flowchart illustrating another example of the method for transmitting and receiving a wake-up signal proposed in this specification.

First, a UE receives information about a category related to operation of a WUR module (S1610).

Here, the information about the category may include an on-duration and an off-duration.

Then, the UE monitors a wake-up signal for the on-duration of the received information about the category (S1620).

Subsequently, a main communication module is woken when the UE does not receive the wake-up signal for a specific time as a monitoring result (S1630).

Here, the main communication module may be an 802.11 module or a WLAN module.

Then, the UE may operate in the aforementioned active mode or passive mode using the main communication module (S1640).

Here, the active mode may be a mode in which the main communication module transmits a signal including identification information of the UE to the AP and the passive mode may be a mode in which a broadcast signal is received from the AP.

If the UE operates in the active mode, the UE can receive the broadcast signal from the AP.

In addition, the UE can check whether the AP that has allocated the category has been changed through the broadcast signal.

If the AP that has allocated the category has not been changed, monitoring of the wake-up signal is re-started from the first on-duration of the received category information. If the AP that has allocated the category has been changed, association with the changed AP can be performed.

In addition, the UE may receive information about a category related to operation of the WUR module from the changed AP and monitor the wake-up signal for the on-duration of the received category information received from the changed AP.

Here, the operation of the WUR module may be an operation of receiving the wake-up signal for an on-duration and not receiving the wake-up signal for an off-duration.

Figure 17:
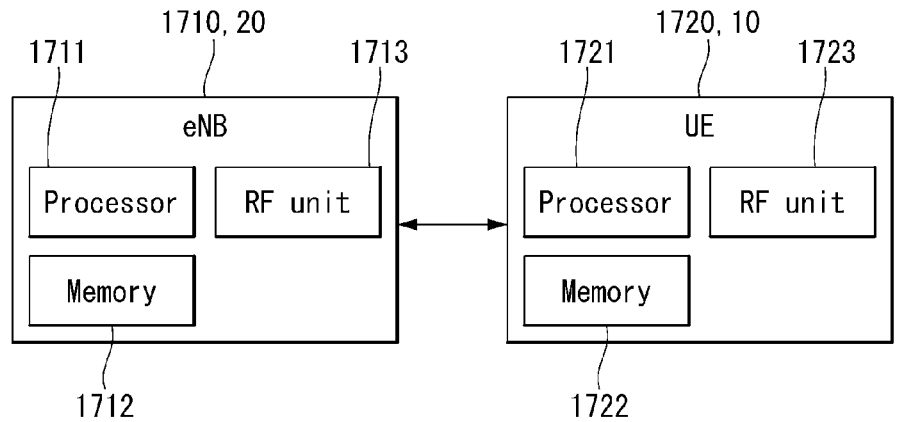
FIG. 17 is a block diagram illustrating a wireless device in which methods as proposed herein may be implemented.

FIG. 17 is a block diagram illustrating a wireless device in which methods as proposed herein may be implemented.

In this case, the wireless device may be a BS, UE, WT, AP, MME or a network entity.

As shown in FIG. 17, the network entity 1710 and the UE 1720 include communication units (transmitting/receiving units, RF units (or RF module), 1713 and 1523), processors 1711 and 1721, and memories 1712 and 1722.

The network entity and the UE may further input units and output units.

The communication units 1713 and 1723, the processors 1711 and 1721, the input units, the output units, and the memories 1712 and 1722 are operatively connected with each other in order to conduct the methods as proposed herein.

The communication units (transmitting/receiving units or RF units, 1713 and 1523), when receiving information created from a Physical Layer (PHY) protocol, transfer the received information through Radio Frequency (RF) spectrums and conduct filtering and amplification, then transmit the results through antennas.

Furthermore, the communication units transfer Radio Frequency (RF) signals received through the antennas to bands capable of being processed by the PHY protocol, and perform filtering.

However, the communication units may also include the functions of switches to switch transmitting and receiving functions.

The processors 1711 and 1721 implement functions, procedures, and/or methods as proposed herein. The layers of radio interface protocols may be implemented by the processors.

The processors may be represented as control parts, controllers, control units, or computers.

The memories 1712 and 1722 are connected with the processors to store protocols or parameters for tracking a location vehicle UE.

The processor may include an application-specific integrated circuit (ASIC), a separate chipset, a logic circuit, and/or a data processing unit. The memory may include read-only memory (ROM), random access memory (RAM), flash memory, memory cards, storage media and/or other equivalent storage devices. The RF unit may include a base-band circuit for processing a radio signal. When the embodiment of the present invention is implemented in software, the aforementioned methods may be implemented with a module (or a process or a function) for performing the aforementioned functions. The module may be stored in the memory and may be performed by the processor. The memory may be located inside or outside the processor, and may be coupled to the processor by using various well-known means.)

The output unit (display unit) is controlled by the processor and outputs information from the process, together with various information signals from the processor and key input signals generated from the key input unit.

Furthermore, although the drawings have been individually described for ease of description, the embodiments shown in the drawings may be merged with each other to implement new embodiments. As necessary by one of ordinary skill, designing recording media readably by a computer recording programs to execute the above-described embodiments also belongs to the scope of the present invention.

Meanwhile, the procedure of transceiving a wake-up signal as described herein may be implemented as processor-readable codes in a recording medium that may be read by a processor provided in a network device.

The process readable recording media include all types of recording devices storing data that is readable by the processor. Examples of the recording media readable by the process include ROMs, RAMs, CD-ROMs, magnetic tapes, floppy discs, optical data storage devices, etc., and may be further implemented in the form of carrier waves such as transmitted over the Internet.

Furthermore, the recording media readable by the processor may be distributed to computer systems connected with each other via a network, and processor readable codes may be stored and executed in a distributing manner.

Figure 18:
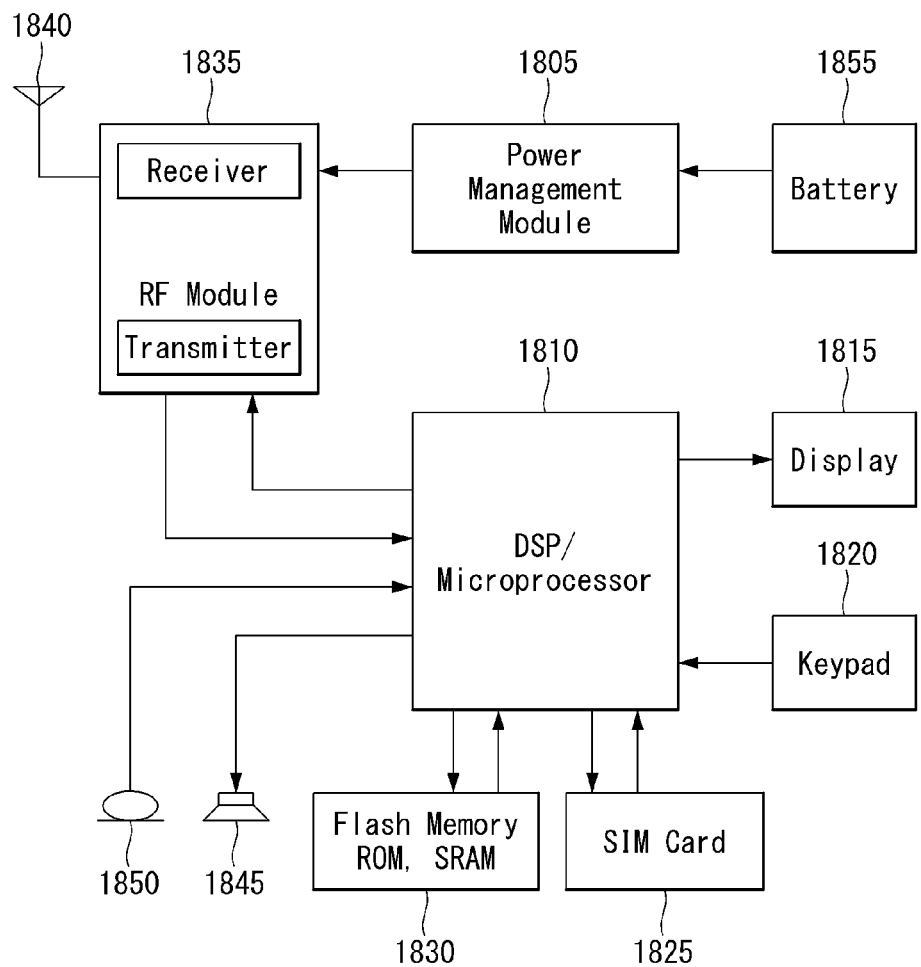
FIG. 18 illustrates a block diagram of a wireless device according to an example of the present specification.

FIG. 18 illustrates a block diagram of a wireless device according to an example of the present specification.

Specifically, FIG. 18 illustrates the terminal (UE) of FIG. 17 in detail.

Referring to FIG. 18, the UE may include a processor (or a digital signal processor (DSP) 1810, a radio frequency (RF) module (or an RF unit) 1835, a power management module 1805, an antenna 1840, a battery 1855, a display 1815, a keypad 1820, a memory 1830, a subscriber identification module (SIM) card 1825 (this element is optional), a speaker 1845, and a microphone 1850. The UE may also include a single antenna or multiple antennas.

The processor 1810 implements the functions, processes and/or methods proposed in FIGS. 1 to 16 described above. A layer of a radio interface protocol may be implemented by the processor 1810.

The memory may be connected to the processor 1810 and stores information related to an operation of the processor 1810. The memory 1830 may be present within or outside the processor 1810 and may be connected to the processor 1810 by a well known unit.

A user may input command information such as a phone number, or the like, by pressing (or touching) a button of the keypad 1820 or by voice activation using the microphone 1850. The processor 1810 receives the command information and performs an appropriate function such as making a call, or the like. Operational data may be extracted from the SIM card 1825 or the memory 1830. Also, the processor 1810 may display command information or driving information on the display 1815 for user recognition or for user convenience.

The RF module 1835 is connected to the processor 1810 and transmits and/or receives an RF signal. The processor 1810 delivers command information to the RF module 1835 in order to initiate communication, for example, in order to transmit a wireless signal forming voice communication data. The RF module 1835 includes a receiver and a transmitter to receive and transmit a wireless signal. The antenna 1840 serves to transmit and receive a wireless signal. When a wireless signal is received, the RF module 1835 delivers the signal and converts the signal to a baseband signal so as to be processed by the processor 1810. The processed signal may be converted into an audible or readable information output through the speaker 1845.

In the aforementioned embodiments, the elements and characteristics of the present invention have been combined in specific forms. Each of the elements or characteristics may be considered to be optional unless otherwise described explicitly. Each of the elements or characteristics may be implemented in such a way as to be not combined with other elements or characteristics. Furthermore, some of the elements and/or the characteristics may be combined to form an embodiment of the present invention. The order of the operations described in connection with the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

An embodiment of the present invention may be implemented by various means, for example, hardware, firmware, software or a combination of them. In the case of implementations by hardware, an embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers and/or microprocessors.

In the case of an implementation by firmware or software, an embodiment of the present invention may be implemented in the form of a module, procedure, or function for performing the aforementioned functions or operations. Software code may be stored in memory and driven by a processor. The memory may be located inside or outside the processor, and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

Examples in which the method for transmitting and receiving a wake-up signal in a wireless communication system according to an embodiment of the present invention has been applied to 3GPP LTE/LTE-A/LTE-Pro/New Rat systems have been described, but the method may be applied to various wireless communication systems in addition to the 3GPP LTE/LTE-A/LTE-Pro/New Rat systems.

What is claimed is:

1. A method for transmitting a wake-up signal in a wireless communication system supporting a wake-up radio (WUR) operation, the method performed by a network entity comprising:
   transmitting a first wake-up signal for waking up a specific terminal to a specific access point (AP);
   transmitting a second wake-up signal to all APs within a coverage of the network entity if a response for the first wake-up signal is not received before a first timer expires; and
   transmitting, to a base station, a response message including control information indicating whether the specific terminal exists,
   wherein the control information indicates that the specific terminal exists when the response for the second wake-up signal is received before a second timer expires,
   wherein the control information indicates that the specific terminal does not exist if the response for the second wake-up signal is not received until the second timer expires.

2. The method of claim 1, wherein the network entity transmits information for a category assigned to the specific terminal to all the APs together with the second wake-up signal.

3. The method of claim 2, wherein the information for a category includes an on-duration that the wake-up signal is transceiver and an off-duration that the wake-up signal is not transceived.

4. The method of claim 3, wherein the network entity transmits information for a time point at which a category is assigned to the specific terminal to all the APs together with the second wake-up signal.

5. The method of claim 1, wherein a duty cycle of the category assigned to the specific terminal is changed in units of a predetermined time.

6. The method of claim 5, wherein the duty cycle includes an on-duration and an off-duration.

7. The method of claim 1, wherein the first timer is run when the network entity transmits the first wake-up signal.

8. The method of claim 1, wherein the second timer is run when the network entity transmits the second wake-up signal.

9. The method of claim 1, further comprising:
   receiving, from a base station, a first message including a wake-up indication indicating that a main communication module of the specific terminal is waken-up,
   wherein the received first message includes identification information identifying the specific AP.

* * * * *